(12) United States Patent
Karaoguz et al.

(10) Patent No.: US 8,208,449 B2
(45) Date of Patent: Jun. 26, 2012

(54) MULTI-MODE WLAN/PAN MAC

(75) Inventors: Jeyhan Karaoguz, Irvine, CA (US);
Eric J. Ojard, San Francisco, CA (US);
Edward H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 1220 days.

(21) Appl. No.: 10/930,504

(22) Filed: Aug. 31, 2004

(65) Prior Publication Data

US 2005/0147071 A1    Jul. 7, 2005

Related U.S. Application Data

(60) Provisional application No. 60/534,731, filed on Jan. 5, 2004.

(51) Int. Cl.
*H04W 4/00* (2009.01)
*H04W 40/00* (2009.01)
(52) U.S. Cl. .......... 370/338; 370/328; 455/449
(58) Field of Classification Search .......... 370/328, 370/338; 455/449
See application file for complete search history.

(56) References Cited

U.S. PATENT DOCUMENTS

| | | | |
|---|---|---|---|
| 7,194,283 B2 * | 3/2007 | Kardach et al. | 455/552.1 |
| 2002/0176388 A1 * | 11/2002 | Rankin et al. | 370/338 |
| 2005/0009578 A1 * | 1/2005 | Liu | 455/574 |
| 2005/0165916 A1 * | 7/2005 | Cromer et al. | 709/220 |
| 2005/0265482 A1 * | 12/2005 | Peek et al. | 375/316 |

* cited by examiner

*Primary Examiner* — Patrick Edouard
*Assistant Examiner* — Matthew Genack
(74) *Attorney, Agent, or Firm* — Garlick & Markison; Shayne X. Short

(57) ABSTRACT

A novel solution is presented in which a MAC (Medium Access Controller) is implemented that includes multiple functionality types. This MAC may include functionality supporting communication according to one or more of the IEEE 802.11 WLAN (Wireless Local Area Network) related standards and also to one or more of the standards generated by the IEEE 802.15.3 PAN (Personal Area Network) working group. By providing this dual functionality of a multi-mode WLAN/PAN MAC, a communication device may adaptively change the manner in which it communicates with other communication devices. For example, in an effort to maximize throughput and overall efficiency of communication within a communication system, certain of the various devices may change from using the WLAN related standards to using the PAN related standards, and vice versa, based on any one or more of a variety of operational parameters including system configuration.

74 Claims, 15 Drawing Sheets dual beacon monitoring functionality supporting first and second operational modes ad hoc WLAN (Wireless Local Area Network) communication system infrastructure/multiple AP (Access Point) WLAN (Wireless Local Area Network) communication system WLAN (Wireless Local Area Network) communication system

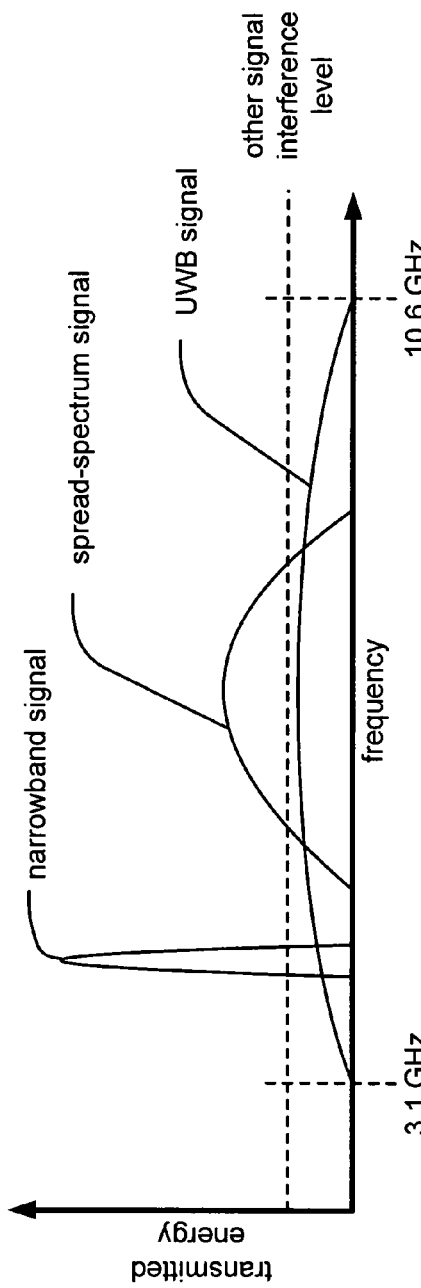
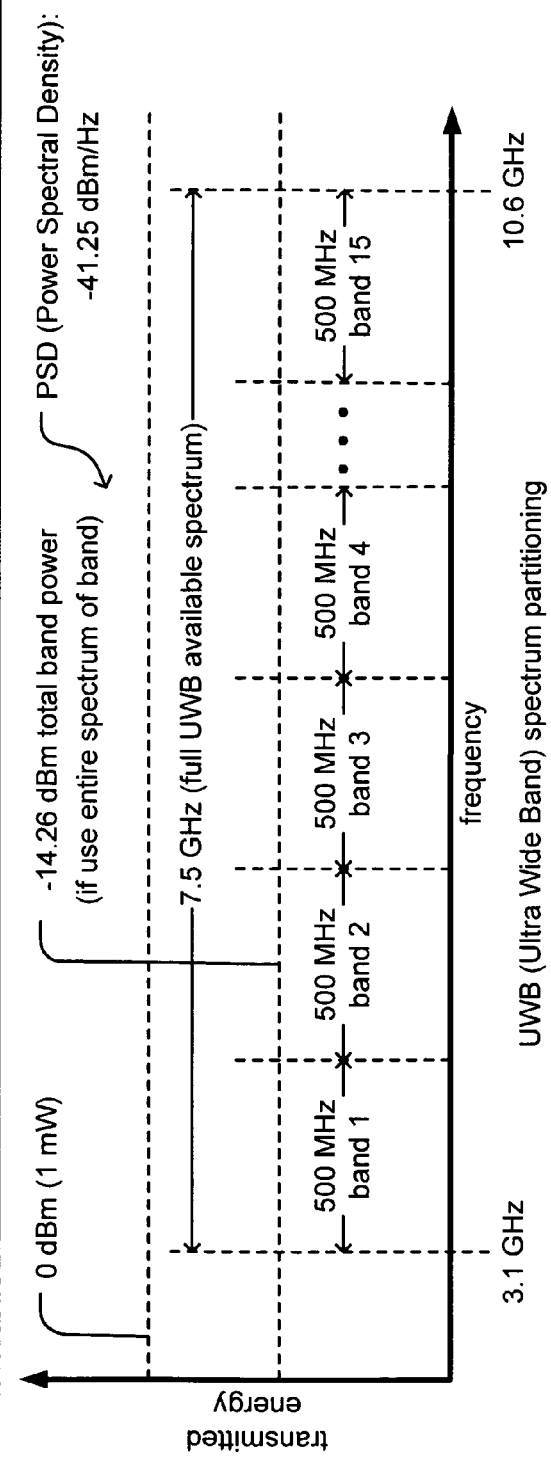

piconet/PAN (Personal Area Network) (shown in wireless communication system embodiment)

beacon structure similarities of IEEE 802.11 and IEEE 802.15.3 communications method for supporting both IEEE 802.11 and IEEE 802.15 functionality within wireless communication system method for selecting IEEE 802.11 and/or IEEE 802.15 communication functionality method for dynamically selecting between IEEE 802.11 and/or IEEE 802.15 communication functionality backbone being extended back 1 or more layers into a communication system

MULTI-MODE WLAN/PAN MAC

CROSS REFERENCE TO RELATED PATENTS/PATENT APPLICATIONS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:
1. U.S. Provisional Application Ser. No. 60/534,731, entitled "Multi-mode WLAN/PAN MAC,", filed Jan. 5, 2004.

BACKGROUND OF THE INVENTION

1. Technical Field of the Invention

The invention relates generally to communication systems; and, more particularly, it relates to management and allocation of the available communication resources and functionality within communication systems.

2. Description of Related Art

Data communication systems have been under continual development for many years. In recent years, WPANs (Wireless Personal Area Networks) have been under increasing development. A WPAN may be viewed as a network that is established when two or more devices connect to support communication of data between themselves in an area having a radius of up to approximately 10 meters. Typically, earlier implementations of WPANs include a central PNC (piconet coordinator) or a "master" that governs the communication of all of the other communication devices within the WPAN. Although some more recent designs of WPANs focus more particularly distributed control of the network management and communication between the various devices therein. Also, any of the communication devices within such a WPAN is typically capable of operating as the PNC.

As is known, the Bluetooth® communication standard is the first such PAN (Personal Area Network) communication standard that has been developed. In accordance with the Bluetooth® communication standard, the communication between the various devices in such a WPAN is strictly performed using an M/S (Master/Slave) configuration. Each of the devices within such a Bluetooth® WPAN is M/S capable. Typically one of the devices or a first device within the Bluetooth® WPAN, transmits a beacon signal (or an access invitation signal) while operating as the "master" device of the Bluetooth® WPAN to the other "slave" devices of the Bluetooth® WPAN. In other words, the "master" device of the Bluetooth® WPAN polls the other "slave" devices to get them to respond.

However, other WPANs may be implemented such that the devices do not operate according to such an M/S (Master/Slave) type relationship. Typically, some of the communication devices within the WPAN are designated and operate as PNCs, and some of the communication devices are designated and operate as DEVs. The PNCs operate to coordinate the communication between themselves and the DEVs within the WPAN. Sometimes, such a PNC may be implemented to operate as a master with respect to the 1 or more DEVs that operate as slaves, but this need not be the case in all instances—the strict M/S relationship is typically the case only in a Bluetooth® WPAN.

In even some other instances, two or more Bluetooth® piconets operate cooperatively such that they communicate via the masters of the two or more corresponding Bluetooth® piconets. For example, in a scatternet, a single DEV may interact with two or more masters. This implementation will allow various devices within different piconets that are located relatively far from one another to communicate with one another via the masters of their corresponding piconets. However, within a scatternet implementation, a problem may arise such that each of the individual piconets must be able to operate in relative close proximity with other piconets without interfering with one another. This inherently requires a great deal of synchronization between the piconets, which may be very difficult to achieve in some instances. It is also noted that independently operating piconets, not implemented within a scatternet implementation, may also suffer from deleterious effects of interference with other piconets located within relative close proximity.

Some PAN communication standards and recommended practices have been developed (and some are still being developed) by the IEEE (Institute of Electrical & Electronics Engineers) 802.15 working group. These standards and recommended practices may generally be referred to as being provided under the umbrella of the IEEE 802.15 working group. Perhaps the most common standard is the IEEE 802.15.1 standard which adopts the core of Bluetooth® specification and which generally can support an operational rate of 1 Mbps (Mega-bits per second).

The IEEE 802.15.2 recommended practice specification has been developed primarily in an effort to support the co-existence of the IEEE 802.15.1 Bluetooth® core with IEEE 802.11b and IEEE 802.11g WLANs (Wireless Local Area Networks). As some examples of the pertinent frequency spectra of concern, the IEEE 802.11b and IEEE 802.11g WLAN (Wireless Local Area Network) standards both operate within the approximate 2.4 GHz frequency range. The IEEE 802.11a WLAN standard operates within the approximate 5 GHz frequency range. This IEEE 802.15.2 recommended practice specification has been developed to ensure that such a WLAN and a Bluetooth® piconet may operate simultaneously within relatively close proximity of one another without significant interference with one another.

In addition, the IEEE 802.15.3 high data rate PAN standard has been developed in an effort to support operational rates up to approximately 55 Mbps. In this IEEE 802.15.3 standard, the PNCs and DEVs do not operate according to an M/S relationship as they do according to Bluetooth®. In contradistinction, a PNC operates similarly to an AP (Access Point) and manages the various DEVs such that they are guaranteed to perform their respective communication according to their appropriate time slots thereby ensuring proper performance and operation within the piconet. An extension (currently under progress) of the IEEE 802.15.3 high data rate PAN standard is the IEEE 802.15.3 WPAN (Wireless Personal Area Network) High Rate Alternative PHY Task Group 3a (TG3a). This is sometimes referred to the IEEE 802.15.3a extended high data rate PAN standard, and it can support operational rates up to 480 Mbps.

Yet another standard developed by the IEEE 802.15 working group is the IEEE 802.15.4 low data rate PAN standard that generally supports data rates within the range of approximately 10 kbps (kilo-bits per second) and 250 kbps.

Referring to the IEEE 802.11 standards, it has been under continual development in an effort to try to improve the way in which WLANs operate. In this particular effort, there have been a number of amendments to the IEEE 802.11 standard, initially starting with the 802.11a standard, and then also including the commonly known 802.11b standard and an even newer amendment, namely, the 802.11g standard. The 802.11g standard is backward compatible with the 802.11b standard, so that legacy devices within the WLAN can still interact with the WLAN, although 802.11g operable devices operating within an 802.11b WLAN typically employ a reduced functionality set.

There are typically two manners that are known in the art by which a WLAN may be implemented: ad hoc (shown in FIG. 1A) and infrastructure (shown in FIG. 1B).

FIG. 1A is a system diagram illustrating a prior art ad hoc WLAN (Wireless Local Area Network) communication system. Referring to FIG. 1A, the ad hoc implementation employs a number of WLAN interactive devices that are typically operable to communicate with each of the other WLAN interactive devices within the WLAN. There is oftentimes no regimented or organized structure to the network. In some instances, one of the WLAN interactive devices is designated as a master of the network and the other WLAN interactive devices operate as slaves with respect to that master.

FIG. 1B is a system diagram illustrating a prior art infrastructure/multiple AP (Access Point) WLAN communication system. Referring now to the FIG. 1B, in the infrastructure (or multiple AP) WLAN, a number of APs are employed to support communication with the WLAN interactive devices (which are sometimes referred to as STAs (wireless STAtions) in the infrastructure implementation). This infrastructure architecture uses fixed network APs with which the STAs can communicate. These network APs are sometimes connected to landlines (that may be connected to one or more WANs (Wide Area Networks)) to widen the communication system's capability by bridging wireless nodes to other wired nodes. If service areas overlap, handoffs can occur. This infrastructure structure may be implemented in a manner that is analogous to the present day cellular networks around the world.

Considering the various 802.11 standards, the IEEE 802.11g standard extends the data rates for packet transmission in the 2.4 GHz (Giga-Hertz) frequency band. This is achieved by allowing packets, also known as frames, of two distinct types to coexist in this band. Frames utilizing DSSS/CCK (Direct Sequence Spread Spectrum with Complementary Code Keying) modulation have been specified for transmission in the 2.4 GHz band at rates up to 11 Mbps (Mega-bits per second) as part of the 802.11b standard. The 802.11a standard uses a different frame format with OFDM (Orthogonal Frequency Division Multiplexing) modulation to transmit at rates up to 54 Mbps (Mega-bits per second) with carrier frequencies in the 5 GHz band. The 802.11g standard allows for such OFDM frames to coexist with DSSS/CCK frames at 2.4 GHz. However, the properties of these two different types of frames, as well as their processing at an 802.11g receiver, are very different. Also, this portion of the frequency spectrum is unlicensed, so there are many other non-packet signals present in this band which should be ignored by an 802.11g receiver. In general, there are a variety of ways in which the communications may be supported under the umbrella of the IEEE 802.11 standards.

In the current state of the art, the standards generated by the IEEE 802.15 working group and the IEEE 802.11 standards are separate and distinct in operation with no overlap with one another. A primary design directive of the various communication protocols associated with these standards is to allow their co-existence without interacting and/or interfering with one another. Within the prior art, those communication systems and devices included therein that employ any of the standards generated by the IEEE 802.15 working group exclusively employ a standard generated by the IEEE 802.15 working group, and those communication systems and devices included therein that employ any of the IEEE 802.11 related standards exclusively employ an IEEE 802.11 related standard.

BRIEF SUMMARY OF THE INVENTION

Various aspects of the invention can be found in a communication device including a multi-mode WLAN/PAN MAC (Wireless Local Area Network/Personal Area Network Medium Access Controller). The communication device includes at least one PHY receiver and at least one MAC (Medium Access Controller) that is communicatively coupled to that PHY receiver. The MAC is implemented to provide for functionality of at least two different operational modes.

This may be achieved in any of a variety of ways. Fore example, a single MAC may be employed that has 2 distinct and separate functional blocks contained therein to support 2 different operational modes. Alternatively, 2 entirely separate MACs may be employed such that each MAC supports one of the operational modes, and only one of the MACs is employed at any given time.

Similarly, the PHY receiver may be implemented in a number of ways. For example, a single circuitry including more that one PHY receiver portion may be employed that is operable to process received signals from other communication devices within whichever type of communication system the communication device may be implemented, and the appropriate PHY receiver portion of the circuitry is then operable to provide the processed received signals to the MAC (or more than 1 MAC, depending on the particular implementation). There are a variety of combinations in which this PHY to MAC interfacing within the communication device may be implemented varying from 1 to 2 PHY receivers and from 1 to 2 MACs. However, regardless of the manner in which the PHY and MAC interface is implemented, the MAC operates as a multi-mode WLAN/PAN MAC that allows the communication device to support operation in either one of a WLAN (Wireless Local Area Network) or a piconet/PAN (Personal Area Network).

For example, looking at some examples of various types of operational modes that may be supported by such a multi-mode MAC, a first operational mode may be implemented as an IEEE (Institute of Electrical & Electronics Engineers) 802.11 type operational mode, and a second operational mode may be implemented as an IEEE 802.15 type operational mode. In such an instance, the communication device is then operable to operate within a first communication system of a WLAN as well as a second communication system of a piconet/PAN. The communication device may switch operational modes over time. For example, the communication device may initially operate according to the IEEE 802.11 type operational mode, and then the communication device may subsequently operate according to the IEEE 802.15 type operational mode. The converse may alternatively be performed: the communication device may initially operate according to the IEEE 802.15 type operational mode, and then the communication device may subsequently operate according to the IEEE 802.11 type operational mode. It is also noted that the IEEE 802.11 type operational mode may correspond to any one of the IEEE 802.11a standard, the IEEE 802.11b standard, or the IEEE 802.11g standard. Similarly, the IEEE 802.15 type operational mode may correspond to any one of the IEEE 802.15.3 high data rate PAN standard or the IEEE 802.15.3a extended high data rate PAN standard.

Generally, any number of various embodiments of communication devices that include a multi-mode WLAN/PAN MAC as described herein can operate according to multiple operational modes including an IEEE 802.11 type operational mode and an IEEE 802.15 type operational mode. By allowing various communication links within such a communication system to upgrade to IEEE 802.15.3 functionality from IEEE 802.11 functionality, the various communication devices within such a communication system can offload the bandwidth used for one operational mode (e.g., IEEE 802.11) for use in another operational mode (e.g., IEEE 802.15.3). By providing the multi-mode WLAN/PAN MAC within the various communication devices within such a communication system, the overall operation of the communication system may be performed as to ensure greater throughput and overall efficiency. Moreover, various types of methods may be performed to support the functionality described herein without departing from the scope and spirit of the invention.

BRIEF DESCRIPTION OF THE SEVERAL VIEWS OF THE DRAWINGS

FIG. 3A is a diagram illustrating an embodiment of the frequency spectrum of a UWB (Ultra Wide Band) signal when compared to some other signal types according to certain aspects of the invention.

FIG. 3B is a diagram illustrating an embodiment of UWB (Ultra Wide Band) spectrum partitioning into a plurality of sub-bands according to certain aspects of the invention.

DETAILED DESCRIPTION OF THE INVENTION

Various embodiments are described herein to show some of the possible manners in which a multi-mode WLAN/PAN MAC (Wireless Local Area Network/Personal Area Network Medium Access Controller) may be implemented within various communication devices in accordance with the invention. Some general examples of the types of communication systems in which such multi-mode WLAN/PAN MACs may be implemented are provided, but such a multi-mode WLAN/PAN MAC may generally be implemented within any appropriate communication device to allow the communication device to support communication according to various operational modes. Two such operational modes that are included within this scope are those associated with the IEEE 802.11 related standards and those standards generated by the IEEE 802.15.3 working group.

Figure 1A:
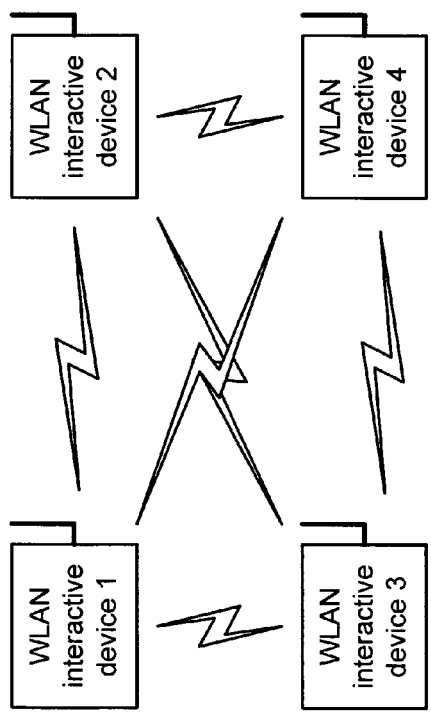
FIG. 1A is a diagram illustrating a prior art ad hoc WLAN (Wireless Local Area Network) communication system.
Figure 1B:
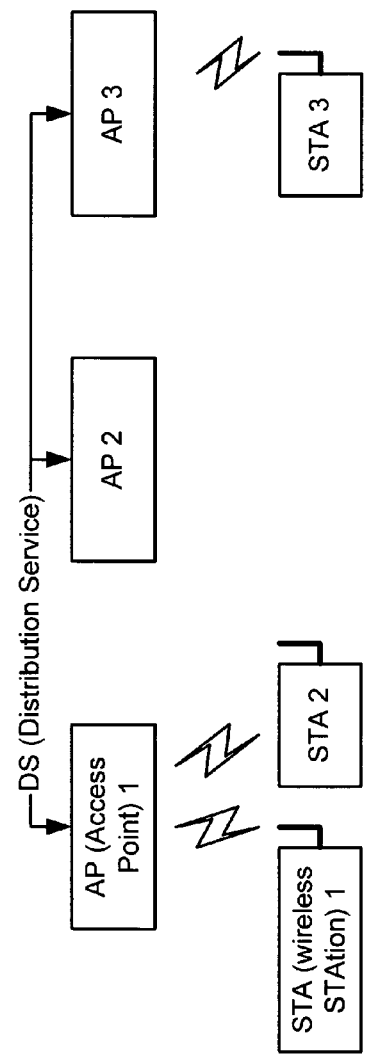
FIG. 1B is a diagram illustrating a prior art infrastructure/multiple AP (Access Point) WLAN communication system.
Figure 2:
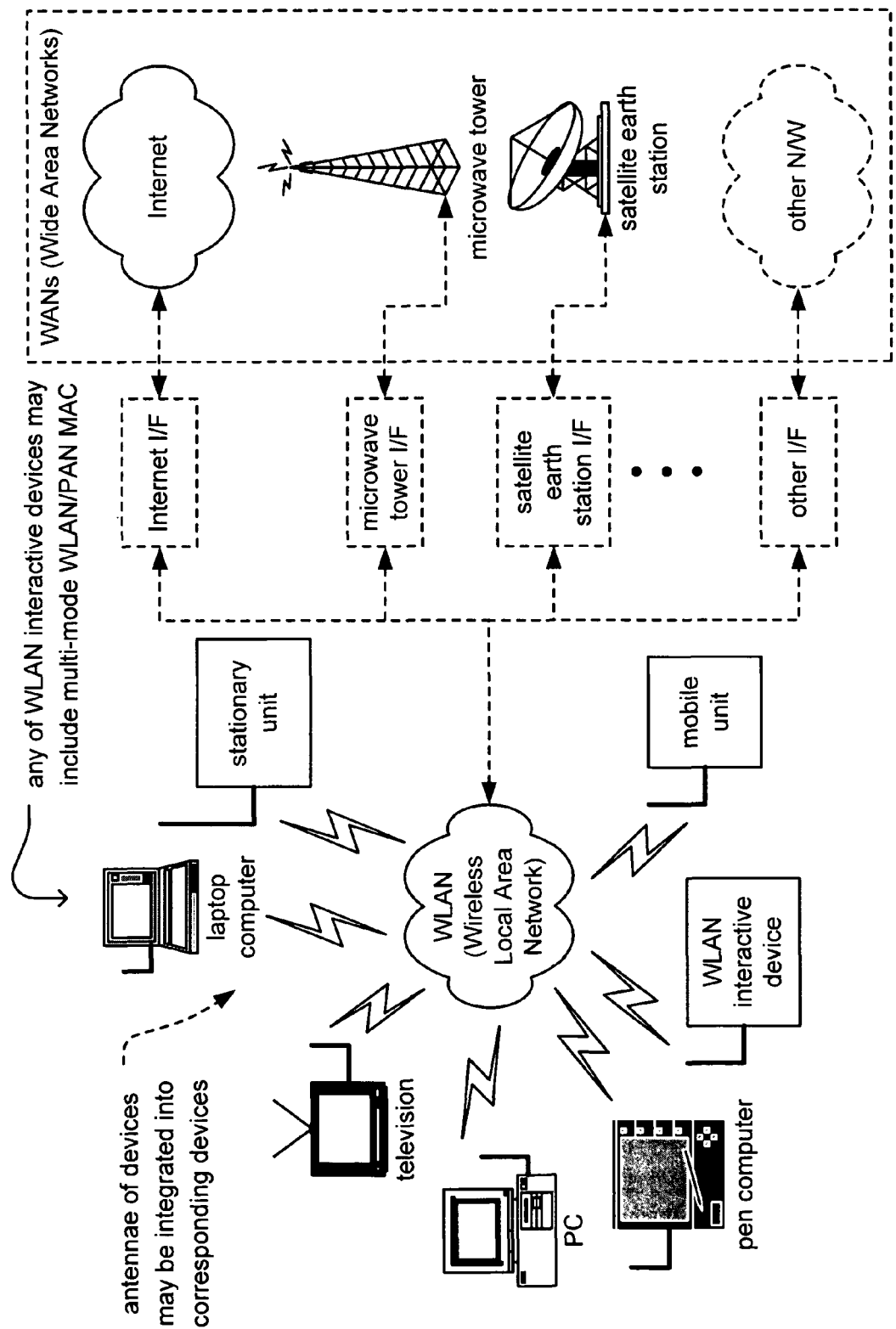
FIG. 2 is a diagram illustrating an embodiment of a WLAN that may be implemented according to certain aspects of the invention.

FIG. 2 is a diagram illustrating an embodiment of a WLAN (Wireless Local Area Network) that may be implemented according to certain aspects of the invention. The WLAN communication system may be implemented to include a number of devices that are all operable to communicate with one another via the WLAN. For example, the various devices that each include the functionality to interface with the WLAN may include any one or more of a laptop computer, a television, a PC (Personal Computer), a pen computer (that may be viewed as being a PDA (Personal Digital Assistant), a personal electronic planner, or some similar device in various instances), a mobile unit (that may be viewed as being a telephone, a pager, or some other mobile WLAN operable device), and/or a stationary unit (that may be viewed as a device that typically resides in a single location within the WLAN). The antennae of the various WLAN interactive devices may be integrated into the respective, corresponding devices without departing from the scope and spirit of the invention as well.

This illustrated group of devices that may interact with the WLAN is not intended to be an exhaustive list of device that may interact with a WLAN, and a generic device shown as a WLAN interactive device represents any generic device that includes the functionality in order to interactive with the WLAN itself and/or the other devices that are associated with the WLAN in accordance with one or more of the various embodiments of the invention described herein. Any of these devices that associate with the WLAN may be viewed generically as being such a WLAN interactive device without departing from the scope and spirit of the invention. Each of the devices and the WLAN interactive device may be viewed as being located at nodes of the WLAN.

It is also noted that the WLAN itself may also include functionality to allow interfacing with other networks as well. These external networks may generically be referred to as WANs (Wide Area Networks). For example, the WLAN may include an Internet I/F (interface) that allows for interfacing to the Internet itself. This Internet I/F may be viewed as being a base station device for the WLAN that allows any one of the WLAN interactive devices to access the Internet.

It is also noted that the WLAN may also include functionality to allow interfacing with other networks, such as other WANs, besides simply the Internet. For example, the WLAN may include a microwave tower I/F that allows for interfacing to a microwave tower thereby allowing communication with one or more microwave networks. Similar to the Internet I/F described above, the microwave tower I/F may be viewed as being a base station device for the WLAN that allows any one of the WLAN interactive devices to access the one or more microwave networks via the microwave tower.

Moreover, the WLAN may include a satellite earth station I/F that allows for interfacing to a satellite earth station thereby allowing communication with one or more satellite networks. The satellite earth station I/F may be viewed as being a base station device for the WLAN that allows any one of the WLAN interactive devices to access the one or more satellite networks via the satellite earth station I/F.

This finite listing of various network types that may interface to the WLAN is not intended to be exhaustive. For example, any other network may communicatively couple to the WLAN via an appropriate I/F that includes the functionality for any one of the WLAN interactive devices to access the other network.

Any one or more of the various WLAN interactive devices described within this embodiment may each be implemented to include a multi-mode WLAN/PAN MAC that is described herein according to the invention. For example, in this particular embodiment, the functionality of at least one of the operational modes is associated with one or more of the IEEE 802.11 related standards (e.g., including 802.11a, 802.11b, and 802.11g). In one embodiment, another of the operational modes supported by a multi-mode WLAN/PAN MAC that may be implemented within any one or more of the WLAN interactive devices is operable to support communications according to one or more of the standards generated by the IEEE 802.15.3 working group. By providing such a multi-mode WLAN/PAN MAC within the devices of such a communication system, the various devices may switch back and forth between the various operational modes supported by the multi-mode WLAN/PAN MAC. In doing so, a greater allocation and management of the available communication resources and functionality within the communication system, including the individual communication resources of the individual communication devices within the communication system, may be made.

As mentioned above, one of the particular embodiment in which the invention may be implemented includes a multi-mode WLAN/PAN MAC that supports communication according to one or more of the IEEE 802.11 related standards and also according to one or more of the standards generated by the IEEE 802.15.3 working group. As such, some more information is provided below regarding some ways in which a piconet/PAN (Personal Area Network) may be implemented. Such information is important in ensuring that such a multi-mode WLAN/PAN MAC is indeed operable to support communications according to both one or more of the IEEE 802.11 related standards and also according to one or more of the standards generated by the IEEE 802.15.3 working group that employ UWB (Ultra Wide Band) signals.

FIG. 3A is a diagram illustrating an embodiment of the frequency spectrum of a UWB (Ultra Wide Band) signal when compared to some other signal types according to certain aspects of the invention. UWB communications operate by sending pulses whose energy spreads across a broad frequency spectrum. For comparison, RF (Radio Frequency) communications typically operate by using a narrowband frequency carrier to transmit information. RF signals may be viewed as occupying a relatively narrowband range of frequency spectra. It is also noted that the PSD (Power Spectral Density) of a UWB signal typically does not rise above the PSDs of other interfering signals within an available spectrum of interest.

A UWB signal is one type of a spread-spectrum signal. A spread-spectrum signal may be viewed as a signal that occupies a frequency band that is much wider than the minimum bandwidth required by the information signal. For example, a transmitter "spreads" the energy (that is typically originally concentrated in narrowband) across a wider frequency band. One benefit of a spread-spectrum signal is that it provides increased immunity with respect to narrowband interference. A narrowband signal will not fully obliterate the UWB signal because of the much wider bandwidth of the UWB signal. It is also important to note that a UWB signal may also be characterized as a function of time, not frequency.

FIG. 3B is a diagram illustrating an embodiment of UWB (Ultra Wide Band) spectrum partitioning into a plurality of sub-bands according to certain aspects of the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any UWB signal within the available UWB spectrum to be 500 MHz (Mega-Hertz).

Moreover, this FCC definition allows for a PSD across the UWB spectrum of −41.25 dBm/MHz of bandwidth. As a reminder, 0 dBm is the decibel (dB) measure of power of a signal referenced to 1 mW (milli-Watt). This means that the total power that may be employed by a UWB signal is approximately −14.26 dBm in any individual 500 MHz sub-band within the entire available UWB bandwidth of 7.5 GHz. In addition, if a pulse is sent using the entire 7.5 GHz of available UWB bandwidth, then the total transmitted power of a UWB signal is approximately −2.5 dBm.

Figure 4:
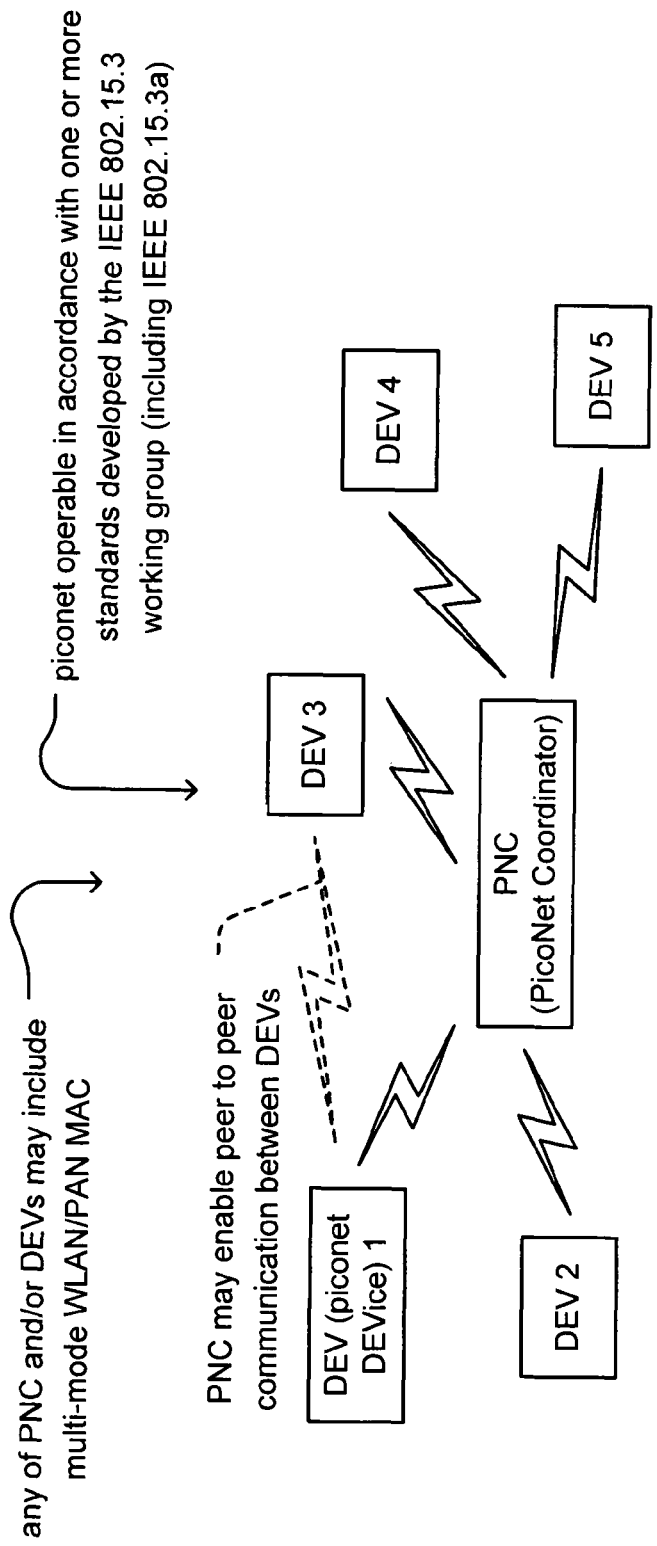
FIG. 4 is a diagram illustrating an embodiment of a piconet/PAN (Personal Area Network) (shown as a wireless communication system) that is built according to certain aspects of the invention.

FIG. 4 is a diagram illustrating an embodiment of a piconet/PAN (Personal Area Network) (shown as a wireless communication system) that is built according to certain aspects of the invention. In general, a piconet may be viewed a subset of the general type of wireless type network, WPAN. This embodiment may be viewed as being a piconet type implementation of a WPAN. The use of the terminology piconet is typically used to characterize the smallest such wireless type network that falls under the WPAN umbrella. From this perspective, a piconet may be viewed as being the network that is established when any two devices connect to support communication between them. The piconet may be implemented using a number of piconet operable devices such that one of the piconet operable devices is designated as and operates as a PNC (piconet coordinator) and 1 or more of the other piconet operable devices are designated as and operate as DEVs (piconet devices). In some instances, the DEVs may communicate with one another according to a p2p (peer to peer) relationship. Alternatively, the DEVs may communicate with one another via the PNC (where the PNC operates essentially as a relaying element).

To support communication between each of the DEVs (which may be performed simultaneously at some times) and the PNC, the communication must be implemented in such a way that the communication links between each DEV and the PNC will not interfere with the other communication links in any other SOP (Simultaneously Operating Piconet) that is located within a relatively close proximity to this piconet. That is to say, when two or more piconets operate within relatively close proximity to one another, the communication within each of the respective piconets must be implemented in such a way that simultaneously operation of the two or more piconets (e.g., the coexistence and operation) may be performed without interfering with one another.

Moreover, the piconet/WPAN shown in this embodiment, as well as within other embodiments described herein are operable in accordance with the constraints provided by the IEEE 802.15.3 high data rate PAN standard and may also be implemented such that the piconet is operable in accordance with other wireless communication standards as well (e.g., including other standards generated by the IEEE 802.15.3 working group).

Figure 5:
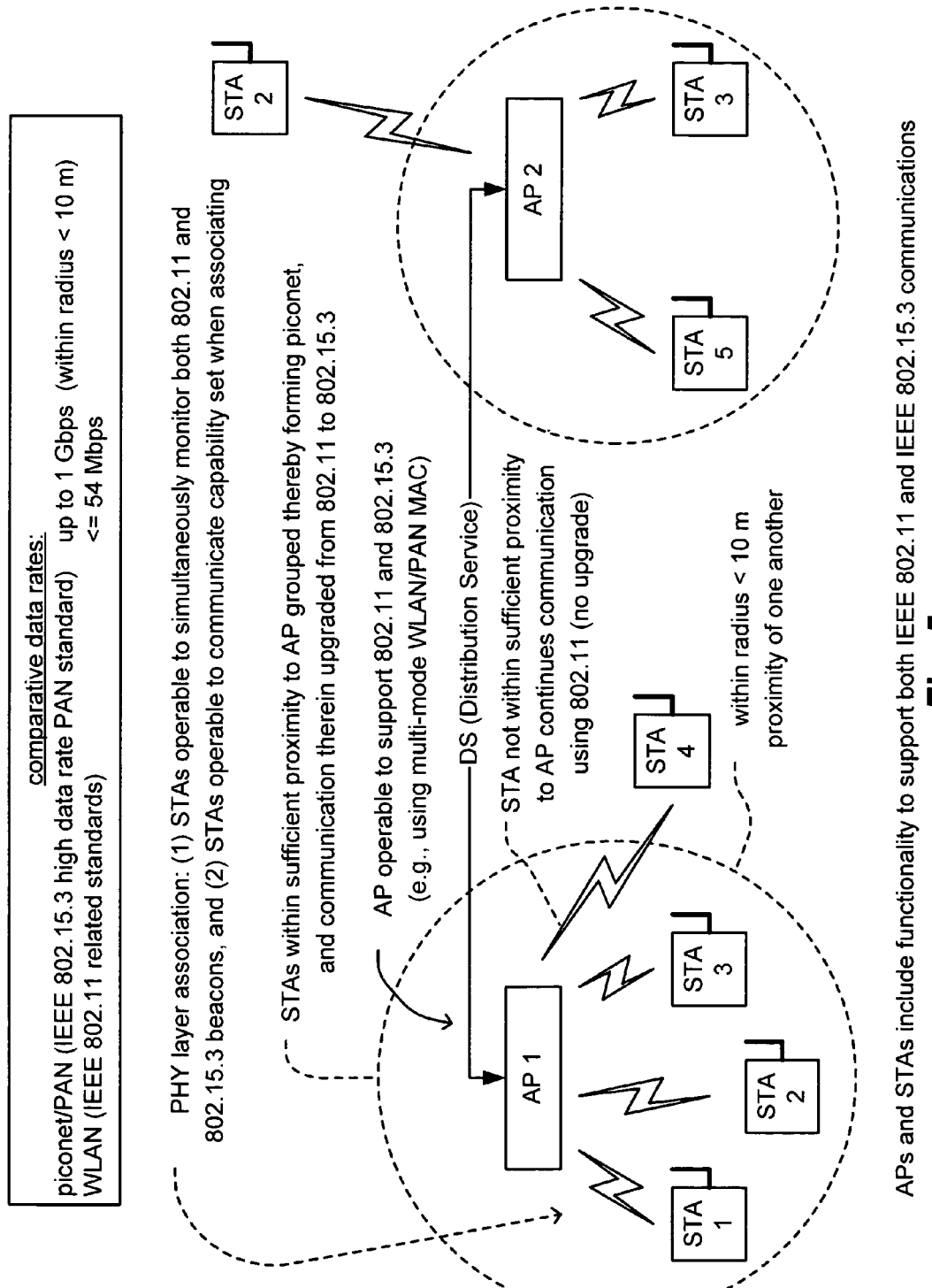
FIG. 5 is a diagram illustrating an embodiment of APs and STAs that include functionality to support both IEEE 802.11 and IEEE 802.15.3 communication according to certain aspects of the invention.

FIG. 5 is a diagram illustrating an embodiment of APs and STAs that include functionality to support both IEEE 802.11 and IEEE 802.15.3 communication according to certain aspects of the invention. This embodiment shows how a WLAN may be implemented such that the various devices included therein (APs and STAs) sometimes operate according to one or more of the IEEE 802.11 related standards and sometimes operate according to one or more of the standards generated by the IEEE 802.15.3 working group. This way, various devices within such a communication system may operate according to a WLAN at a given time, and other of the devices within the communication system may operate according to a piconet/PAN at the same given time. This may be achieved borrowing on the functionality provided by the multi-mode WLAN/PAN MACs that are implemented within each of the communication devices included within this communication system.

From one perspective, the STAs that are located within a sufficiently close proximity to their respective AP may upgrade the communication supported between them from an IEEE 802.11 related standard to a higher date rate standard generated by the IEEE 802.15.3 working group. For example, the communication between such STAs and AP may be upgraded from the IEEE 802.11b standard to the IEEE 802.15.3 high data rate PAN standard in one exemplary situation. By doing this upgrading of the communication supported between the devices to a higher data rate piconet/PAN supported protocol, these devices may benefit from greater throughput and efficiency of operation. By the vary nature that the 802.11 related standards are designed to ensure co-existence with the standards generated by the IEEE 802.15.3 working group, these STAs and AP may operate in such a way as to have minimal (if any) interference with other STAs and APs that may continue to operate according to one of the 802.11 related standards. Moreover, even an AP that has had communication links to its respective STAs upgraded to a higher data rate communication link (e.g., from IEEE 802.11a standard to the IEEE 802.15.3 high data rate PAN standard) may continue to support communication with other of its respective STAs according to the non-upgraded 802.11 related standard by which communication was initially supported before the upgrade of some of the communication links. This determination of which STAs are within sufficiently close proximity to their corresponding AP may be performed any number of ways. For example, this may be performed via triangulation using communication between three devices within the communication system. Alternatively, each of the devices may include some position-determining functionality included therein.

By whichever means the relative positions of the various devices is determined within the communication system, a radial distance measurement of approximately 10 m (10 meters) may be employed in determining if the devices are sufficiently close as to permit the upgrading of the communication links therein from an 802.11 related standard to a higher date rate standard generated by the IEEE 802.15.3 working group.

A specific comparison of the improved data rates that may be achieved when upgrading the communications from an 802.11 related standard to a higher date rate standard generated by the IEEE 802.15.3 working group is made here to provide for a specific and concrete example of just one of the beneficial aspects of the invention. Operation according to the IEEE 802.11 related standards generally can support data rates up to approximately 54 Mbps (Mega-bits per second). While this may be perfectly acceptable for certain applications, a higher data rate is almost always preferable. The IEEE 802.15.3 high data rate PAN standard is a standard that can provide for a much higher data rate (increased by a factor of up to approximately 18.5 over the IEEE 802.11 related standards). Specifically, the IEEE 802.15.3 high data rate PAN standard can support data rates up to approximately 1 Gbps (Giga-bits per second) within radial distances of approximately less than 10 m. By ensuring that those devices that are in fact sufficiently close to one another (e.g., less than 10 m radial distance) can in fact operate according to the IEEE 802.15.3 high data rate PAN standard and thereby support the higher data rates approaching approximately 1 Gbps.

The relatively longer distance of the DS (Distribution Service) that communicatively couples various APs within this communication system may continue to operate by supporting the data rates approaching approximately 54 Mbps as supported according to one of the IEEE 802.11 related standards. This relatively longer distance is substantially larger than the approximately less than 10 m radial distance within which the devices whose communication links have been upgraded to operate according to the IEEE 802.15.3 high data rate PAN standard.

It is also noted that each of the various STAs depicted herein may be implemented to be operable to support simultaneous monitoring of both 802.11 and 802.15.3 beacons within the overall communication system. By doing this, the switching from a first operational mode (e.g., 802.11 or 802.15.3) to a second operational modes (e.g., the other of 802.11 or 802.15.3) may be greatly simplified, in that, the STA already is already in synchronization with each of the beacons. That is to say, when a switch in operational modes is to be made, then the STA already is in synchronization with the beacon of the operational mode to which it will be switching. In addition, it is noted that the monitoring of the two beacons may be performed irrespective of whether the switching from a first operational mode to a second operational mode is initiated by one of the APs or by the actual STA.

Moreover, each of the STAs is also operable to communicate its particular capability set when associating with the AP and thereby to the network to which the STA is associating. For example, this may involve providing information corresponding to the version number, protocol options, and any other capability information corresponding to the communication device. This capability information, that is provided during association of the device with the communication network in its particular operational mode at that time, may be provided in the form of an association state (i.e., a state that indicates these operational capabilities) for even greater efficiency and simplicity.

Figure 6:
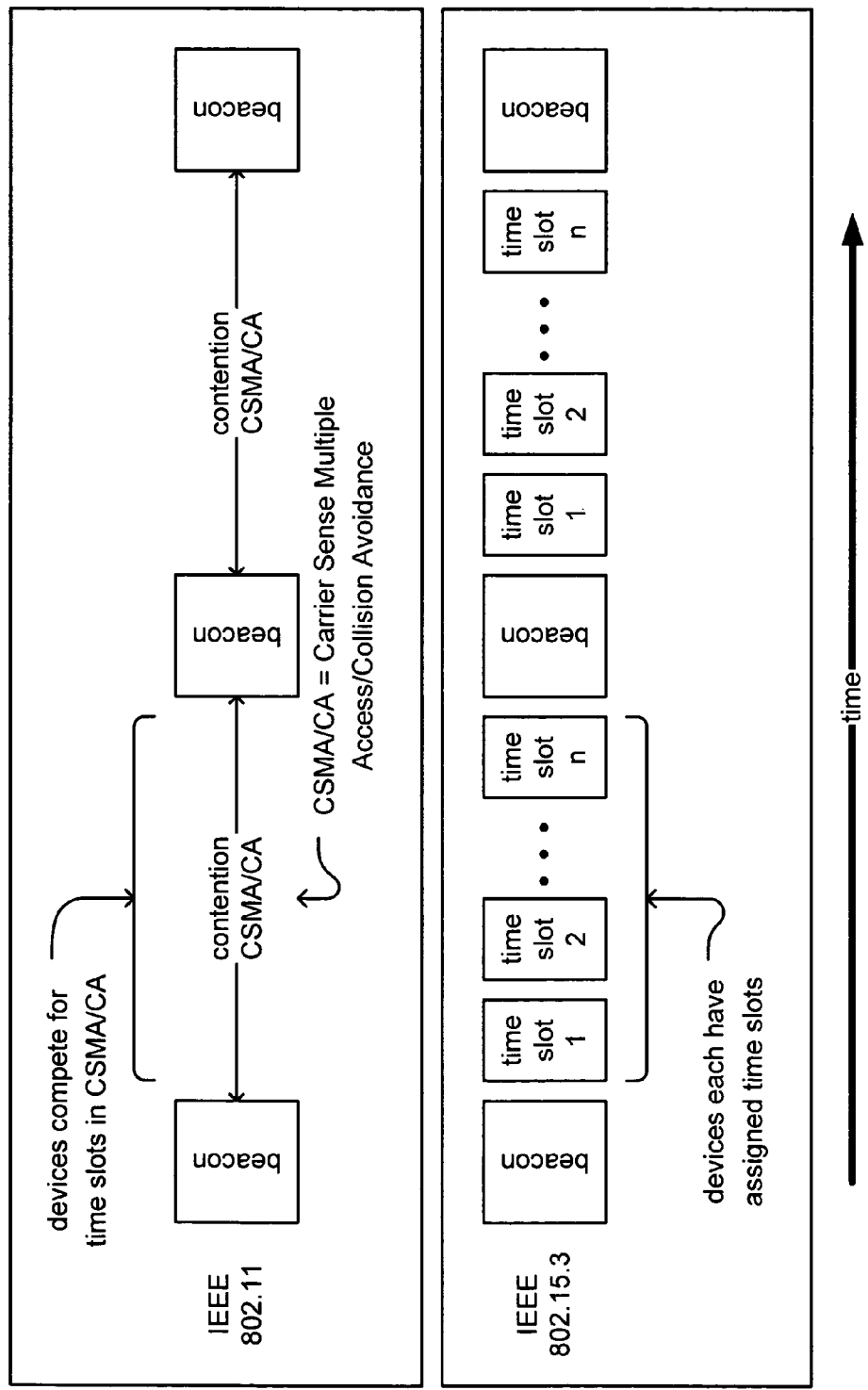
FIG. 6 is a diagram illustrating an embodiment of beacon structure similarities of IEEE 802.11 and IEEE 802.15.3 communications that may be capitalized upon in accordance with certain aspects of the invention.

FIG. 6 is a diagram illustrating an embodiment of beacon structure similarities of IEEE 802.11 and IEEE 802.15.3 communications that may be capitalized upon in accordance with certain aspects of the invention. This commonality of the beacon structure (and therefore the framing structure) that is employed within both IEEE 802.11 and IEEE 802.15.3 communications allows for a multi-mode WLAN/PAN MAC to be designed more efficiently. For example, because each of these types of communications are implemented using a similar beacon structure, the various functional portions of the multi-mode WLAN/PAN MAC may be implemented using relatively similar functional blocks. Although each of the various functional portions of the multi-mode WLAN/PAN MAC do indeed need to provide for different types of functionality, the common beacon structure allows for some commonality in the functional portions of the multi-mode WLAN/PAN MAC thereby allowing for a much more efficient implementation in terms of hardware and processing resources, in that, a relatively significant portion of it may be used to perform processing required for both IEEE 802.11 and IEEE 802.15.3 communications.

The similarities may be better understood when looking at the locations of the beacon signals as a function of time. The beacon signals of both IEEE 802.11 and IEEE 802.15.3 communications may be implemented such that the beacon signals align in time. Within IEEE 802.11 communications, the time in between beacon signals in implemented in a contention manner typically according to CSMA/CA (Carrier Sense Multiple Access/Collision Avoidance). During this time period in between the beacon signals, the various devices within such a WLAN communication system compete for the available time slots in a CSMA/CA manner.

Although a communication system employing IEEE 802.15.3 communications operates differently, the similarities of the bacon structure allow for efficient implementation of a multi-mode WLAN/PAN MAC to support both IEEE 802.11 and IEEE 802.15.3 communications. Communications according to IEEE 802.15.3 communications employ a similar beacon structure to IEEE 802.11 communications, but the time in between beacon signals includes a number of time slots for which the various devices in such a piconet/PAN are assigned to these various time slots. Communication within such a piconet/PAN, according to IEEE 802.11 communications, is often implemented according to QoS (Quality of Service) or some other protocol by which this beacon structure may be supported.

FIG. 7A, FIG. 7B, FIG. 8A, and FIG. 8B are diagrams illustrating various embodiments to implement MAC/PHY (Medium Access Controller/PHYsical Layer) interface within communication devices to support both IEEE 802.11 and IEEE 802.15.3 functionality according to certain aspects of the invention. As shown in the various diagrams of FIG. 7A, FIG. 7B, FIG. 8A, and FIG. 8B, this MAC/PHY interfacing may be a direct connection or direct coupling between a PHY and MAC therein. In such a direct connection or direct coupling between a PHY and MAC as depicted in such diagrams, there are no components implemented between the PHY and MAC such that the interface is a direct connection or direct coupling. It is noted that wherever IEEE 802.15.3 is depicted in this and other diagrams presented herein, IEEE 802.15.3a could alternatively be employed in place of IEEE 802.15.3 without departing from the scope and spirit of the invention.

Any of these various MAC/PHY interfaces may be implemented within any number of types of communication devices. For example, these communication devices may be APs and STAs as described above within the context of an IEEE 802.11 WLAN communication systems described above. However, other types of communication devices may also include any one of the MAC/PHY interfaces described herein within their specific implementation of a multi-mode WLAN/PAN MAC that operates according to the invention.

Figure 7:
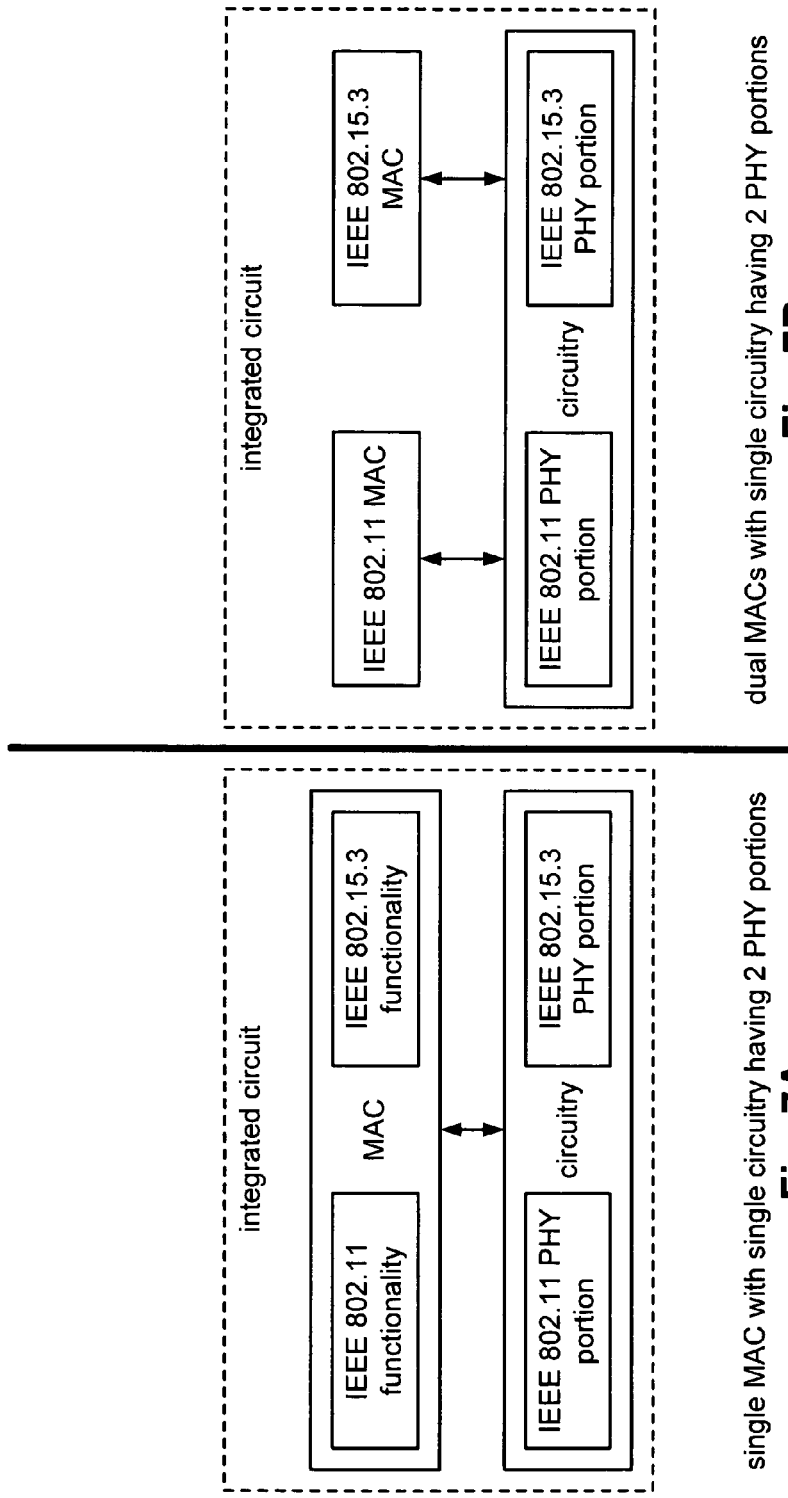
FIG. 7A, FIG. 7B, FIG. 8A, and FIG. 8B are diagrams illustrating various embodiments to implement MAC/PHY (Medium Access Controller/PHYsical Layer) interface within communication devices to support both IEEE 802.11 and IEEE 802.15.3 functionality according to certain aspects of the invention.

Referring to FIG. 7A, this diagram shows an embodiment of a multi-mode WLAN/PAN MAC where a single circuitry having 2 PHY receiver portions (i.e., one for 802.11 and one for 802.15.3) is implemented that interfaces to a single MAC that has 2 separate functional blocks. As shown in the diagram, this MAC/PHY interfacing may be a direct connection or direct coupling between the single circuitry having 2 PHY receiver portions and the single MAC that has 2 separate functional blocks. In such a direct connection or direct coupling as depicted in this diagram, there are no components implemented between the single circuitry having 2 PHY receiver portions and the single MAC that has 2 separate functional blocks. In this embodiment, and in other embodiments employing a PHY receiver, the PHY receiver may be viewed as being a communication receiver, situated low in the communication protocol stack, that is communicatively coupled to a bus that ties the PHY receiver to 1 or more higher protocol layers (such as a MAC (Medium Access Controller) and/or higher application layers in some instances).

This single circuitry (e.g., an integrated circuit) includes functional blocks and/or circuitry therein to support the operations of the 2 separate PHY receiver portions depicted. Generally speaking, the corresponding PHY receiver may be viewed as being a relatively dumb device that is operable to support communication according to either IEEE 802.11 or IEEE 802.15 (depending on which PHY receiver is being referred to).

Each of the functional blocks within the MAC is operable to support a different communication protocol. For example, one portion of the MAC includes a functional block that supports IEEE 802.11 functionality, and another portion of the MAC includes a functional block that supports IEEE 802.15 functionality. The single circuitry that includes the 2 PHY receiver portions only services one of the functional block portions of the MAC at any given time. For example, the 802.11 PHY receiver services the functional block that supports IEEE 802.11 functionality at one time, and the 802.15 PHY receiver services the functional block that supports IEEE 802.15 functionality at another time.

When the communication device that includes a multi-mode WLAN/PAN MAC implemented according to this embodiment operates according to IEEE 802.11, the IEEE 802.11 PHY receiver portion within the single circuitry having the 2 separate PHY receiver portions and the IEEE 802.11 functional block within the MAC are employed. However, when the communication device that includes a multi-mode WLAN/PAN MAC implemented according to this embodiment operates according to IEEE 802.15, the IEEE 802.15 PHY receiver portion within the single circuitry having the 2 separate PHY receiver portions and the IEEE 802.15 functional block within the MAC are employed.

Referring to FIG. 7B, this diagram shows an embodiment of a multi-mode WLAN/PAN MAC where a single circuitry having 2 PHY receiver portions (i.e., one for 802.11 and one for 802.15.3 or 802.15.3a) is implemented that interfaces to 2 separate MACs. As shown in the diagram, this MAC/PHY interfacing may be a direct connection or direct coupling between the single circuitry having 2 PHY receiver portions and the 2 separate MACs. In such a direct connection or direct coupling as depicted in this diagram, there are no components implemented between the single circuitry having 2 PHY receiver portions and the 2 separate MACs. Again, the single circuitry including the 2 PHY receivers may be viewed as being a relatively dumb device that is operable to support communication according to either IEEE 802.11 or IEEE 802.15. Each of 2 MACs is operable to support a different communication protocol. For example, a first MAC supports IEEE 802.11 functionality, and another MAC supports IEEE 802.15 functionality. As with the embodiment described above, the single circuitry that includes the 2 PHY receiver portions only services one of the functional block portions of the MAC at any given time. For example, the 802.11 PHY receiver portion of the single circuitry that includes the 2 PHY receiver portions services the first MAC that supports IEEE 802.11 functionality at one time. The 802.15 PHY receiver portion of the single circuitry that includes the 2 PHY receiver portions services the second MAC that supports IEEE 802.15 functionality at another time.

When the communication device that includes a multi-mode WLAN/PAN MAC implemented according to this embodiment operates according to IEEE 802.11, the IEEE 802.11 PHY receiver portion within the single circuitry having the 2 separate PHY receiver portions and the IEEE 802.11 MAC are employed. However, when the communication device that includes a multi-mode WLAN/PAN MAC implemented according to this embodiment operates according to IEEE 802.15, the IEEE 802.15 PHY receiver portion within the single circuitry having the 2 separate PHY receiver portions and the IEEE 802.15 MAC are employed.

Figure 8:
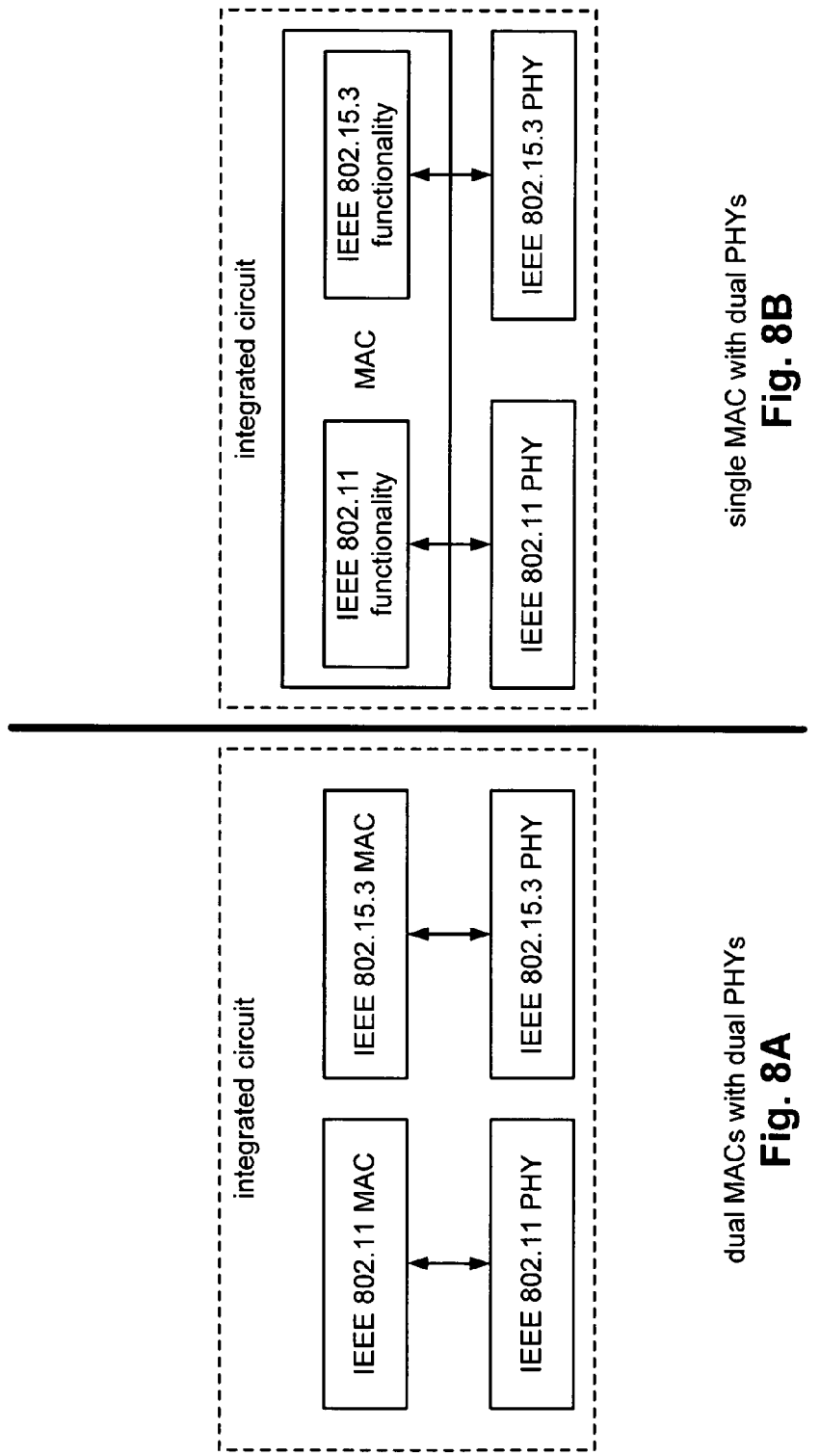

Referring to FIG. 8A, this diagram shows an embodiment of a multi-mode WLAN/PAN MAC where 2 separate PHYs are implemented such that each PHY receiver interfaces to a corresponding MAC. As shown in the diagram, this MAC/PHY interfacing may be a direct connection or direct coupling between each of the 2 separate PHYs and the 2 separate MACS, respectively, in that, each MAC/PHY interfacing is a direct connection there between. In such a direct connection or direct coupling as depicted in this diagram, there are no components implemented between each of the 2 separate PHYs and the 2 separate MACS, respectively. Each of 2 PHYs is operable to support a different communication protocol, and each of 2 MACs is also operable to support the communication protocol that corresponds to the PHY receiver to which that particular MAC is communicatively coupled. For example, a first PHY receiver that supports IEEE 802.11 functionality is communicatively coupled to a first MAC that supports IEEE 802.11 functionality. Similarly, a second PHY receiver that supports IEEE 802.15 functionality is communicatively coupled to a second MAC that supports IEEE 802.15 functionality.

When the communication device that includes a multi-mode WLAN/PAN MAC implemented according to this embodiment operates according to IEEE 802.11, the IEEE 802.11 PHY receiver and the IEEE 802.11 MAC are employed. However, when the communication device that includes a multi-mode WLAN/PAN MAC implemented according to this embodiment operates according to IEEE 802.15, the IEEE 802.15 PHY receiver and the IEEE 802.15 MAC are employed.

Referring to FIG. 8B, this diagram shows an embodiment of a multi-mode WLAN/PAN MAC where 2 separate PHYs are implemented such that each of the PHYs interfaces to a single MAC that has 2 separate functional blocks. As shown in the diagram, this MAC/PHY interfacing may be a direct connection or direct coupling between each of the 2 separate PHYs and the single MAC that has 2 separate functional blocks. In such a direct connection or direct coupling as depicted in this diagram, there are no components implemented between each of the 2 separate PHYs and the single MAC that has 2 separate functional blocks. These 2 separate PHYs may be viewed as being relatively dumb devices that are operable to support communication according to IEEE 802.11 and IEEE 802.15, respectively. Each of the functional blocks within the MAC is operable to support a different communication protocol. For example, one portion of the MAC includes a functional block that supports IEEE 802.11 functionality, and another portion of the MAC includes a functional block that supports IEEE 802.15 functionality. Only one of the 2 PHYs services the MAC having the 2 separate functional blocks at any given time.

When the communication device that includes a multi-mode WLAN/PAN MAC implemented according to this embodiment operates according to IEEE 802.11, the IEEE 802.11 PHY receiver and the IEEE 802.11 functional block within the MAC are employed. However, when the communication device that includes a multi-mode WLAN/PAN MAC implemented according to this embodiment operates according to IEEE 802.15, the IEEE 802.15 PHY receiver and the IEEE 802.15 functional block within the MAC are employed.

These various embodiments show several of the possible embodiments by which the PHY receiver and MAC interface may be implemented within a communication devices that employs a multi-mode WLAN/PAN MAC. While these various embodiments have shown the inclusion of IEEE 802.11 functionality and also IEEE 802.15 functionality, it is also noted that other operational modes may also be included or substituted without departing from the scope and spirit of the invention. For example, a third operational mode may also be included in addition to the IEEE 802.11 functionality and also the IEEE 802.15 functionality that has been used in these illustrative embodiments.

It is also noted that any of the various embodiments by which the MAC/PHY interface may be implemented as described above with respect to the FIG. 7A, FIG. 7B, FIG. 8A, and FIG. 8B may also be implemented as a single integrated circuit such that each of the functional blocks depicted within these embodiments is a circuitry or portion of circuitry within the integrated circuit. More specifically, a single chip solution may be implemented to include each of the various functional blocks depicted within any of these various embodiments.

Figure 9:
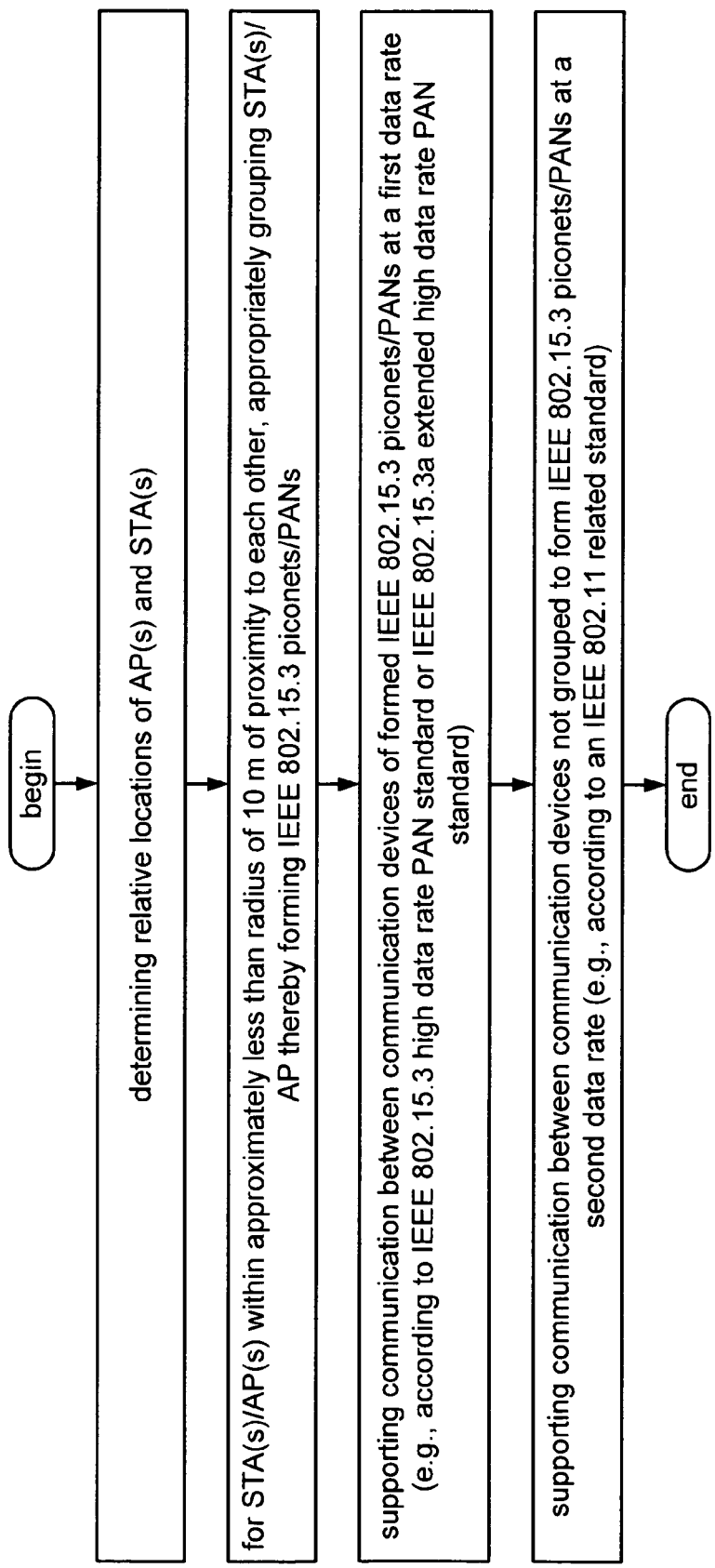
FIG. 9 is a flowchart illustrating an embodiment of a method for supporting both IEEE 802.11 and IEEE 802.15 functionality within a wireless communication system according to certain aspects of the invention.

FIG. 9 is a flowchart illustrating an embodiment of a method for supporting both IEEE 802.11 and IEEE 802.15.3 functionality within a wireless communication system according to certain aspects of the invention. This method initially involves determining the relative locations of 1 or more APs and 1 or more STAs that may be implemented within a communication system. Then, based on the relative locations of those 1 or more APs and 1 or more STAs, then for those 1 or more APs and 1 or more STAs that are located within approximately less than a radius of 10 m of proximity to each other, the method involves appropriately grouping the 1 or more APs and 1 or more STAs thereby forming 1 or more IEEE 802.15.3 piconets/PANs. These 1 or more IEEE 802.15.3 piconets/PANs may be viewed as being a subset of the other communication devices that are already included an IEEE 802.11 WLAN. That is to say, some of the communication devices within the communication system are situated as to communicate with one another according to IEEE 802.11, and other of the communication devices within the communication system are situated as to communicate with one another according to IEEE 802.15.

The method then involves supporting communication between communication devices of the formed 1 or more IEEE 802.15.3 piconets/PANs at a first data rate (e.g., according to IEEE 802.15.3 high data rate PAN standard or IEEE 802.15.3a extended high data rate PAN standard). In general, the communication between the communication devices that have been grouped to form the 1 or more IEEE 802.15.3 piconets/PANs operate at a higher data rate than those communication devices that have not been so grouped. Therefore, the method also involves supporting communication between the communication devices not grouped to form the IEEE 802.15.3 piconets/PANs at a second data rate (e.g., according to an IEEE 802.11 related standard).

Figure 10:
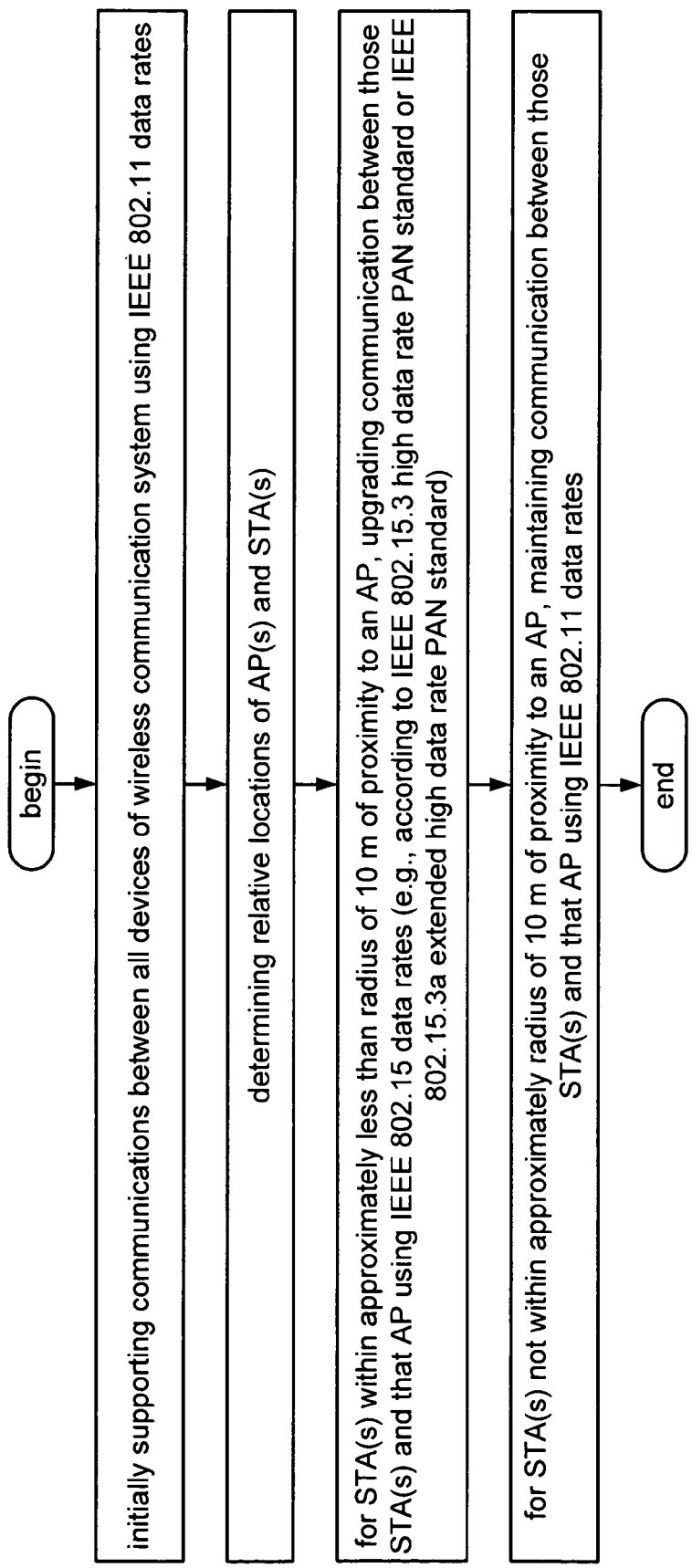
FIG. 10 is a flowchart illustrating an embodiment of a method for selecting IEEE 802.11 and/or IEEE 802.15.3 communication functionality according to certain aspects of the invention.

FIG. 10 is a flowchart illustrating an embodiment of a method for selecting IEEE 802.11 and/or IEEE 802.15 communication functionality according to certain aspects of the invention. This method initially involves supporting communications between all devices of wireless communication system using IEEE 802.11 data rates. Then, the method involves determining the relative locations of 1 or more APs and STAs within the wireless communication system. Then, based on the determined relative locations of the various 1 or more APs and STAs within the wireless communication system, then for those STAs that are found to be within approximately less than radius of 10 m of proximity to of its corresponding AP, the method involves upgrading the communication between those 1 or more STAs and their corresponding APs to higher data rates supported according to the IEEE 802.15 data rates (e.g., using the IEEE 802.15.3 high data rate PAN standard or IEEE 802.15.3a extended high data rate PAN standard). For example, those STAs which are within sufficiently close proximity to their respective AP, the communication between those STAs and its corresponding AP may be implemented according to the IEEE 802.15.3 high data rate PAN standard or the IEEE 802.15.3a extended high data rate PAN standard thereby providing for a much higher data rate, throughput, and system performance when compared to if the STAs and APs continued to operate according to one of the IEEE 802.11 related standards.

However, for those STAs which are not within such a sufficiently close proximity to one another, the communication along those various links is continued to be performed according to the IEEE 802.11 data rates by which the communication was initially begun. For example, for those STAs which are found not to be within approximately less than radius of 10 m of proximity to of its corresponding AP, the method involves maintaining communication between those 1 or more STAs and 1 or more corresponding AP using the initial IEEE 802.11 data rates.

Figure 11:
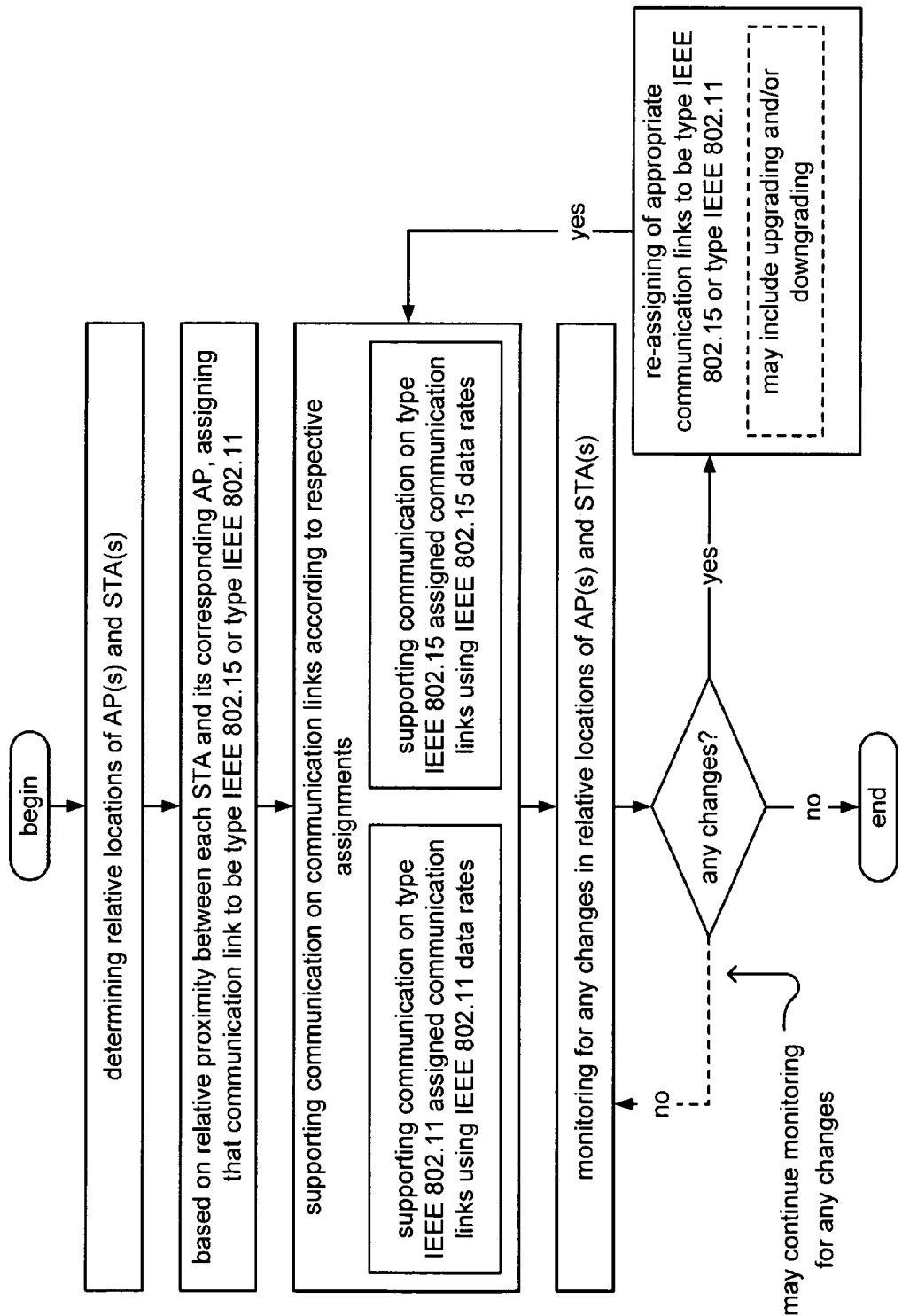
FIG. 11 is a flowchart illustrating an embodiment of a method for dynamically selecting between IEEE 802.11 and/or IEEE 802.15 communication functionality according to certain aspects of the invention.

FIG. 11 is a flowchart illustrating an embodiment of a method for dynamically selecting between IEEE 802.11 and/or IEEE 802.15 communication functionality according to certain aspects of the invention. This method allows for the continued monitoring of any changes of the relative locations of 1 or more of the STAs and APs within a communication system and the re-assigning of any appropriate communication links to be supported either according to IEEE 802.11 or IEEE 802.15 communication functionality.

For example, the method initially involves determining the relative locations of 1 or more APs and 1 or more STAs within a communication system. Then, based on the relative proximity between each of the 1 or more STAs and those STAs' corresponding APs, the method involves assigning those communication links to be of a IEEE 802.15 type operational mode or IEEE 802.11 type operational mode. For example, a similar relative location determination may be made as described within some of the various embodiments above (e.g., a radial distance of approximately less than radius of 10 m). In such an approach, those STAs and corresponding APs that are within sufficiently close proximity of one another may be assigned to support communication according to one of the IEEE 802.15 working group related standards, and those STAs and corresponding APs that are not within such sufficiently close proximity may be assigned to support communication according to one of the IEEE 802.11 related standards.

The method then involves supporting communication on the various communication links within the communication system according to the respective assignments of those communication links. For example, IEEE 802.15 assigned communication links operate to support 802.15 related data rates, and IEEE 802.11 assigned communication links operate to support 802.11 related data rates.

This method then involves monitoring the relative locations of the various communication devices within the communication system for any changes. For example, the method may involve monitoring the relative locations of the 1 or more STAs and 1 or more APs within the communication system. When any changes are in fact detected for the 1 or more STAs and 1 or more APs within the communication system, the method may then involve re-assigning of the appropriate communication links to be IEEE 802.15 type operational mode or IEEE 802.11 type operational mode. For example, some of the communication links may be upgraded (from IEEE 802.11 type operational mode to IEEE 802.15 type operational mode), and some of the communication links may also be downgraded (from IEEE 802.15 type operational mode to IEEE 802.11 type operational mode) depending on any changes in the relative locations of the communication devices within the communication system. The method may then terminate at this point, or the method may continue monitoring for any changes in the relative locations of the various communication devices within the communication system.

It is also noted that the various methods described here within the FIG. 9, FIG. 10, and FIG. 11 may also be performed within the appropriate device and/or system embodiments described within other portions of this specification.

Figure 12:
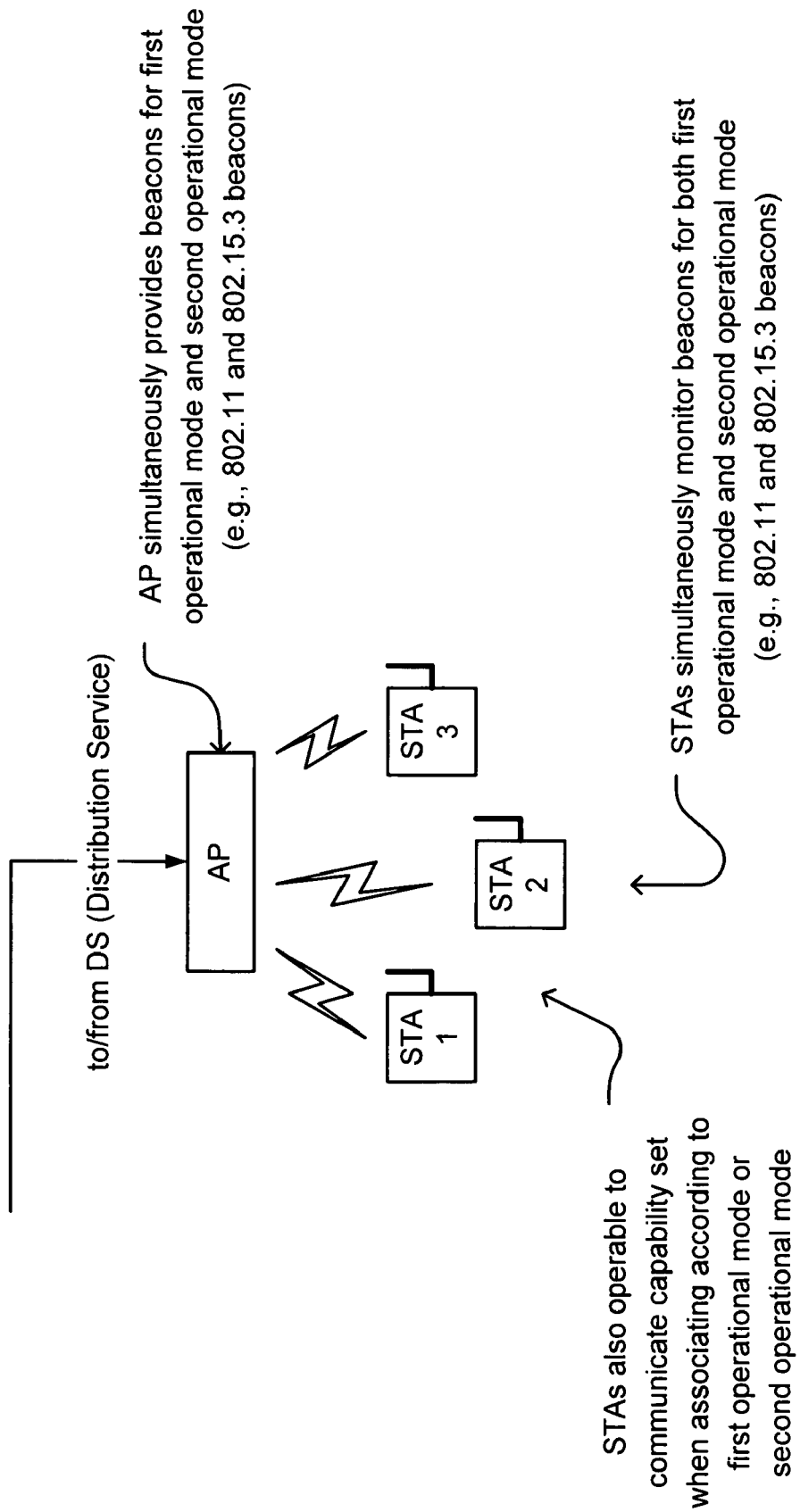
FIG. 12 is a diagram illustrating an embodiment of dual beacon functionality supporting first and second operational modes according to certain aspects to the invention.

FIG. 12 is a diagram illustrating an embodiment of dual beacon functionality supporting first and second operational modes according to certain aspects to the invention. The various APs within the communication system simultaneously provide beacons for both a first operational mode and a second operational mode. For example, beacons corresponding to both an IEEE 802.11 operational mode and beacons corresponding to an IEEE 802.15.3 (or 3a) operational mode are simultaneously provided for receipt by all of the communication devices within the communication system. In some instances (as also described below), the communication system is not simply a dual operational mode communication system, but a three operational mode communication system. For example, the devices may support operational according to not only IEEE 802.11 and 802.15.3 (or 3a), but the communication devices may also be operable to support communication according to IEEE 802.16 (i.e., the IEEE 802.16 WirelessMAN™ Standard for Wireless Metropolitan Area Networks). In these instances, the various APs (or communication devices even higher back into the communication system) may be implemented simultaneously to provide 2 beacons (for IEEE 802.11 and IEEE 802.15.3 (or 3a)) as well as the appropriate MAC bridging to support IEEE 802.16. For example, beacons corresponding to an IEEE 802.11 operational mode, and beacons corresponding to an IEEE 802.15.3 (or 3a) operational mode may be simultaneously provided for receipt by all of the communication devices within the communication system. In addition, appropriate interfacing may also be implemented to include IEEE 802.16 functionality by using the MAC bridging as defined by IEEE 802 LANs. Moreover, additional interface functionality may also be defined based on the need to transfer or convey IEEE 802.16

MAC reservation, end-to-end QoS (Quality of Service), and other functions that are beyond the scope of the MAC bridging.

Regardless of which type of communication system the various communication devices are implemented to support (be they dual mode, or triple mode or even a higher number of operational modes), beacons are provided that correspond to each of the operational modes. Within this particular diagram, the STAs are each operable to perform simultaneously monitoring of a first operational mode and a second operational mode (and even a third operational mode).

By doing this simultaneous broadcasting and monitoring of the beacons within the communication system, when a communication device is to switch from a first operational mode to a second operational mode, the communication device is prepared to synchronize immediately and interface according to the new operational mode.

Moreover, each of the STAs is also operable to communicate its corresponding capability set to the AP when associating with the communication system according to first operational mode or second operational mode. For example, this may involve communicating the version number, protocol options, and other information when associating and registering with the communication system. In short, this involves providing information corresponding to the capability set of the device when registering/associating with the communication system.

Figure 13:
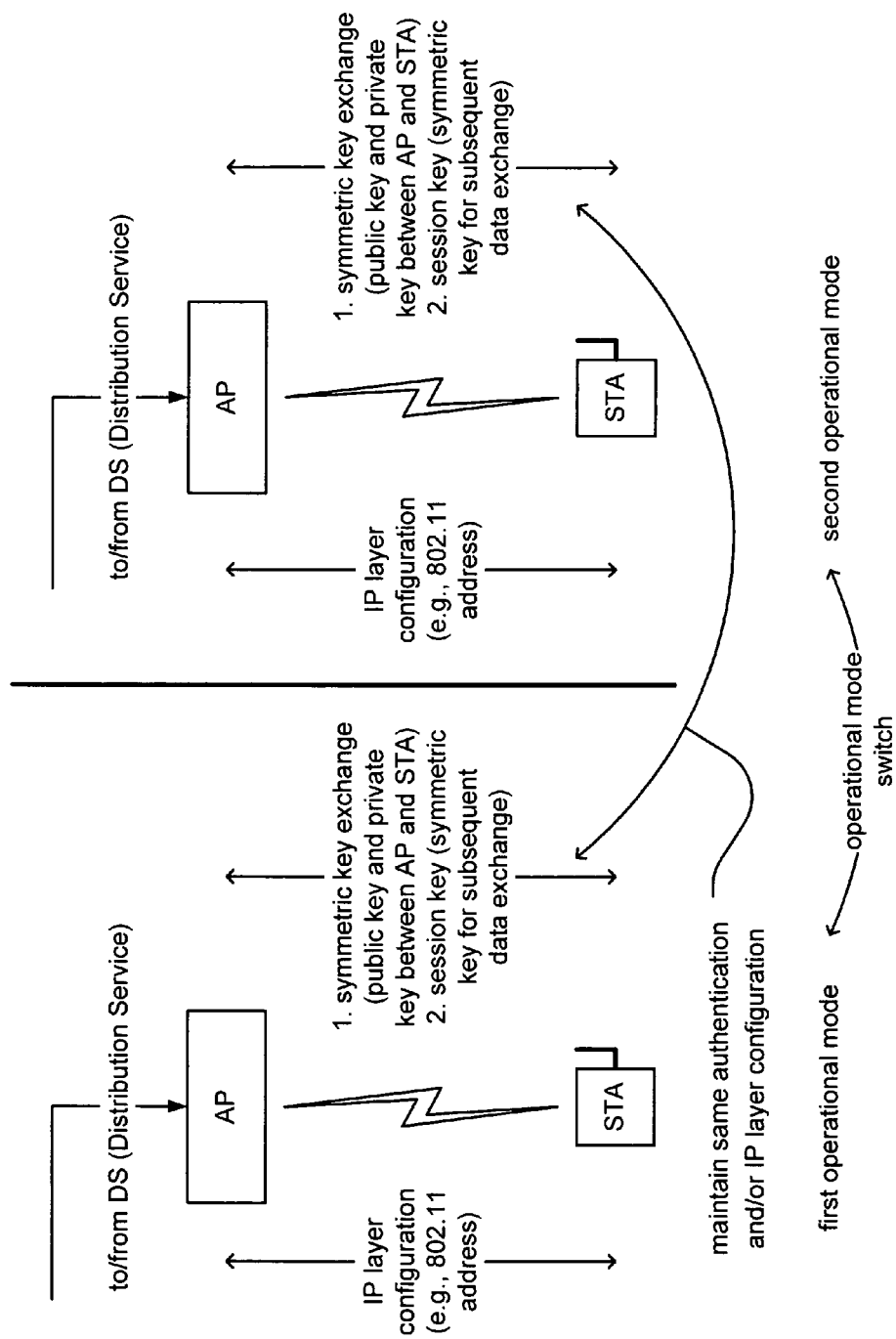
FIG. 13 is a diagram illustrating an embodiment of authentication and/or IP (Internet Protocol) layer configuration when transferring between first and second operational modes according to certain aspects to the invention.

FIG. 13 is a diagram illustrating an embodiment of authentication and/or IP (Internet Protocol) layer configuration when transferring between first and second operational modes according to certain aspects to the invention. With respect to authentication of a communication device (e.g., when associating with and joining the communication system), various means may be employed to ensure that the particular device in fact has authorization to interact with and be a part of the communication system. For example, symmetric key exchange may be employed when a communication device associates according to a first operational mode. This involves providing both a public key and a private key between a particular STA and the AP. Also, an additional form of authentication may involve the provision of a session key. This is also a symmetric key that is typically used for subsequent exchange of data between two communication devices within the communication system.

In addition, when a communication device associates with the communication system, and when that communication device interacts with the Internet (or analogously with some other outside WAN (Wide Area Network)), an IP (Internet Protocol) layer configuration is typically achieved. For example, this may involve providing the appropriate 802.11 address that corresponds to the AP (through which a STA has associated with the communication system) that communicatively couples to the Internet.

As illustrated within this diagram, when the authentication and/or IP layer configuration has been achieved between a STA and an AP while operating according to a first operational mode, this authentication and/or IP layer configuration is also transferred when the operational mode changes from a first operational mode to a second operational mode. This may be viewed as a form of hand-shaking from a security point of view, in that, this authentication information is being passed along when the communication devices switch operational modes from a first operational mode to a second operational mode.

Generally speaking, it is noted that the various functionality employed when operating according to one operational mode is passed along when the communication devices switch to operate according to another operational mode.

Figure 14:
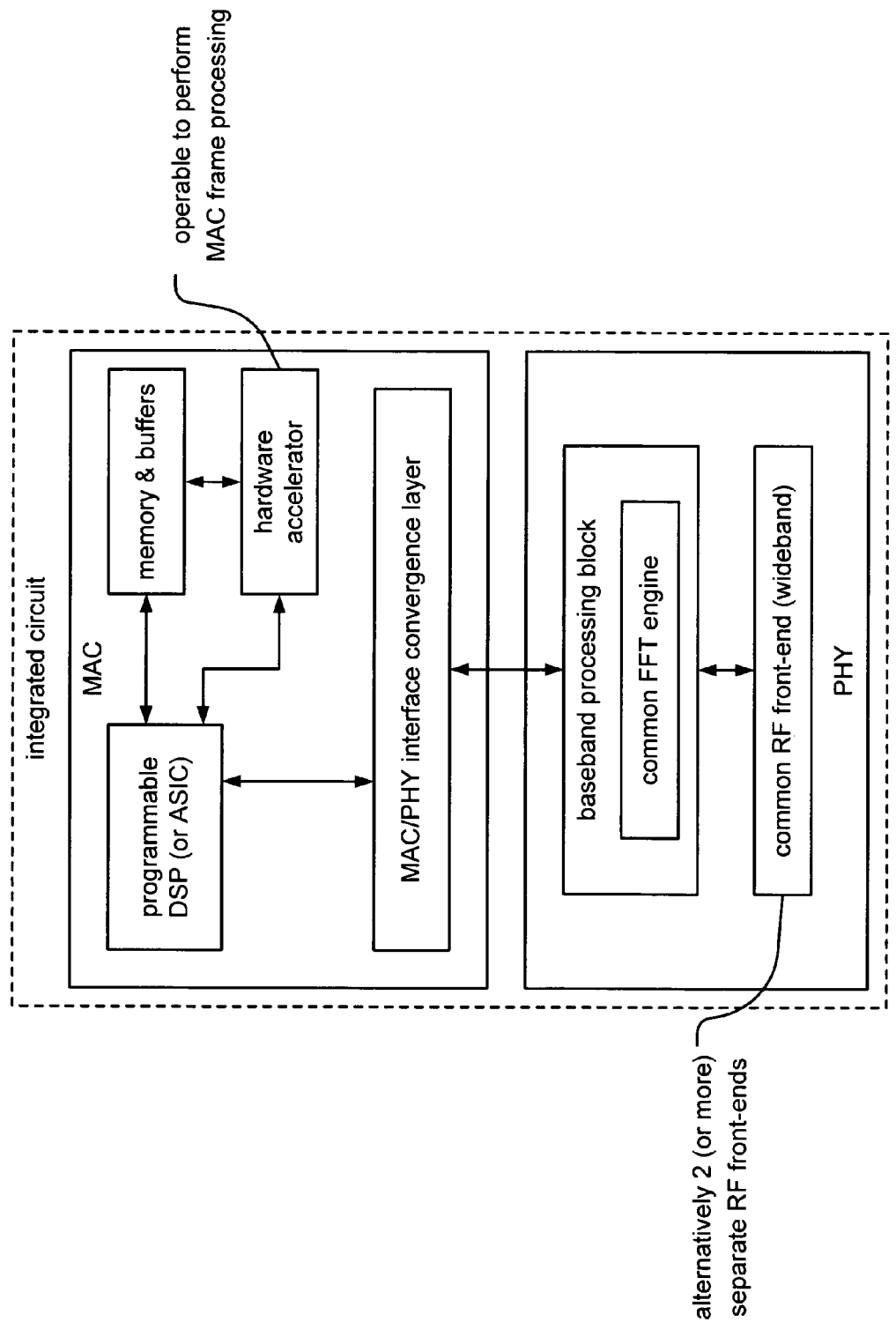
FIG. 14 is a diagram illustrating an embodiment of PHY/MAC arrangement that may be implemented according to certain aspects to the invention.

FIG. 14 is a diagram illustrating an embodiment of PHY/MAC arrangement that may be implemented according to certain aspects to the invention. This diagram shows just one of many possible arrangements by which the PHY and MAC of a multi-mode communication device may be arranged. Each of the various functional blocks described in this diagram may be implemented within a single integrated circuit if desired in some embodiments.

Generally speaking, a PHY receiver is communicatively coupled to a MAC. The PHY receiver may be implemented as including a common RF (Radio Frequency) front-end (i.e., a wideband circuitry portion). Alternatively, the PHY receiver may include 2 (or more, depending on how many operational modes are to be supported) separate RF front-ends. This common RF front-end or these 2 or more RF front-ends may be implemented to perform any of the necessary filtering, gain adjustment, and/or filtering at the PHY level. The RF front-end is communicatively coupled to a baseband processing block within the PHY receiver. This baseband processing block may include a common FFT (Fast Fourier Transform) engine that is operable to perform signal processing for more than one operational mode. The baseband processing block then communicatively couples to the MAC, and more specifically, to a MAC/PHY interface convergence layer within the MAC. The MAC may include a programmable DSP (Digital Signal Processor) (or ASIC (Application Specific Integrated Circuit)) that is also communicatively coupled to the MAC/PHY interface convergence layer. Memory and buffers as well as a hardware accelerator may also be communicatively coupled to the programmable DSP (or ASIC) within the MAC. The hardware accelerator may be communicatively coupled to the memory and buffers. The hardware accelerator may be implemented so as to be operable to perform MAC frame processing.

This diagram shows just one possible means by which a MAC and PHY interface may be implemented. As shown in the diagram, this MAC/PHY interfacing may be a direct connection or direct coupling between the PHY and the MAC. In such a direct connection or direct coupling as depicted in this diagram, there are no components implemented between the PHY and the MAC. Again, a single integrated circuit may be designed so as to include each of the various functional blocks of the PHY receiver and MAC as illustrated in this diagram.

Figure 15:
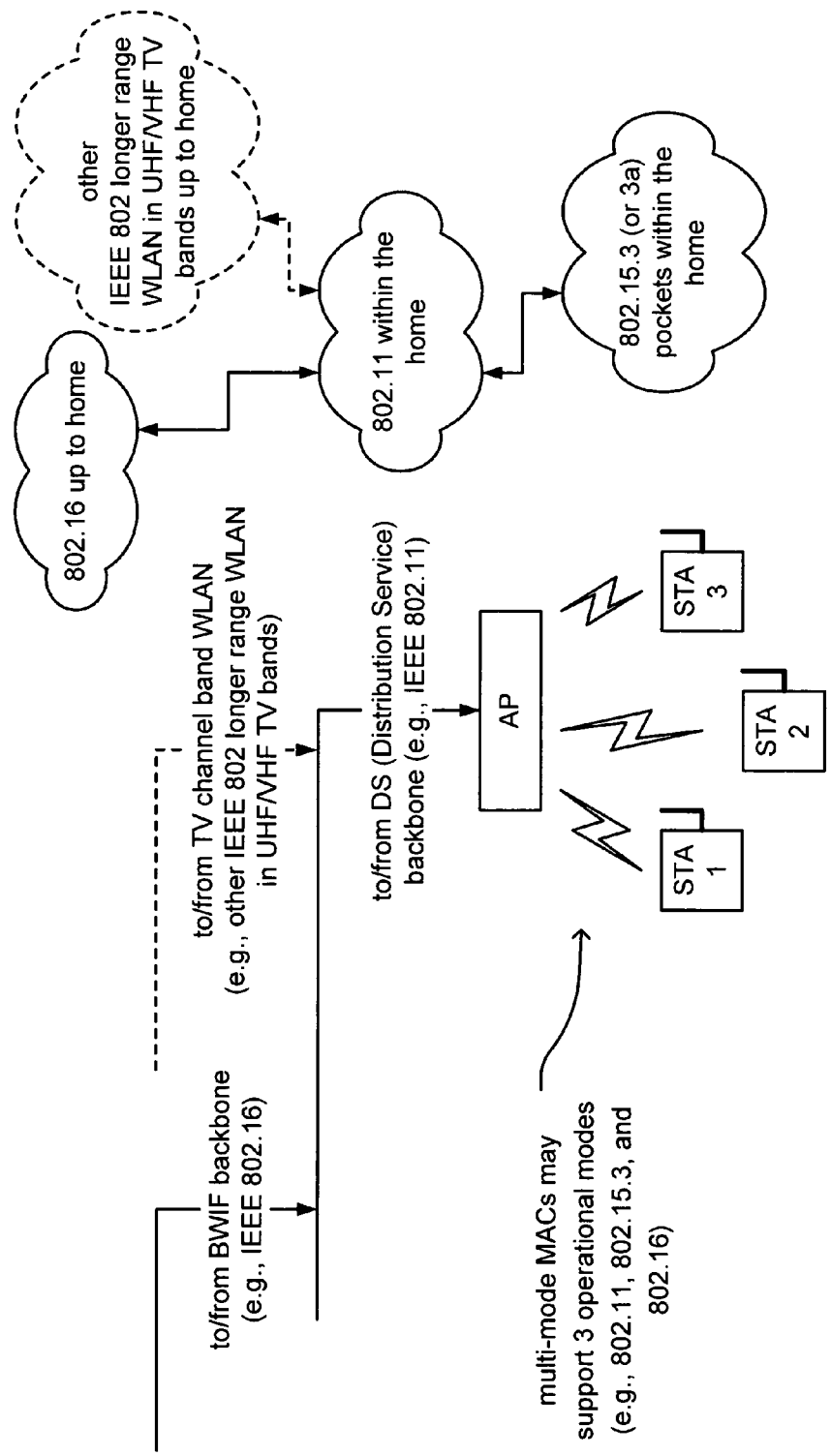
FIG. 15 is a diagram illustrating an embodiment of a backbone being extended back 1 or more layers into a communication system according to certain aspects to the invention.

FIG. 15 is a diagram illustrating an embodiment of a backbone being extended back 1 or more layers into a communication system according to certain aspects to the invention. Within this diagram, the backbone (that was previously shown as being a DS (Distribution Service) backbone (e.g., IEEE 802.11) is extended further back into the communication system to include a fixed wireless/BWIF (Broadband Wireless Interface) backbone (e.g., IEEE 802.16 Wireless-MAN™ Standard for Wireless Metropolitan Area Networks).

This extension of the backbone back into the communication system may alternatively be implemented using an unlicensed WLAN operating in the TV (television) channel bands. Such a WLAN may be viewed as being some other IEEE 802 longer range WLAN whose operational frequency range is in the UHF/VHF TV channel frequency bands. For example, the UHF (ultra high frequency) TV channel band between 300 MHz and 3 GHz as well as the VHF (very high frequency) TV channel band between 30 MHz (wavelength 10 m) and 300 MHz (wavelength 1 m) could be used support the operation of WLANs operating within relatively larger areas (e.g., longer ranges) than many previous WLANs. By using the lower frequency ranges provided by these UHF and VHF TV channel bands, the transmission range of these WLANs would be greatly extended. This could allow such unlicensed WLANs operating in the TV channel bands (e.g., the UHF and VHF frequency bands) to compete significantly with the IEEE 802.16 WirelessMAN™ Standard referenced above in terms of providing for larger regions of wireless networking (e.g., neighborhood-scale wireless networking).

Regardless of the means by which the backbone is extended back (be it IEEE 802.16 or some other IEEE 802 longer range WLAN operating in the UHF/VHF TV channel bands), this extension of the communication system backbone back into the overall and extended communication system provides for even a further degree of flexibility in design.

As one example, communication according to IEEE 802.16 may be performed up to a home (or some other area such as an office building, an apartment complex, or any other area as well), and IEEE 802.11 WLAN may be implemented to support communication among the entire house. Then, where appropriate and possible, pockets of IEEE 802.15.3 (or 3a) may be implemented within the entire region that is also covered by the IEEE 802.11 WLAN.

As another example, communication according to some other IEEE 802 longer range WLAN operating in the UHF/VHF TV channel bands may alternatively be performed up to a home (or some other area such as an office building, an apartment complex, or any other area as well), and IEEE 802.11 WLAN may be implemented to support communication among the entire house. Then, where appropriate and possible, pockets of IEEE 802.15.3 (or 3a) may be implemented within the entire region that is also covered by the IEEE 802.11 WLAN.

Having the availability of multi-mode functionality as provided by multi-mode MACs within the various communication devices within a communication system provides a means by which the operational mode of the communication devices may be optimized to ensure higher performance and greater throughput.

Generally speaking, various embodiments have been described herein to include the capabilities of both IEEE 802.11 and 802.15 (or all three of IEEE 802.11, 802.15, and 802.16 in some embodiments) within a single multi-mode WLAN/PAN MAC. Moreover, various embodiments have been described herein to include the capabilities of all three of IEEE 802.11, 802.15, and some other IEEE 802 longer range WLAN operating in the UHF/VHF TV channel bands within a single multi-mode WLAN/PAN MAC.

As also described above, there are a variety of ways in which a MAC/PHY interface may be implemented to support this multi-mode WLAN/PAN MAC functionality. By allowing various communication links within such a communication system to upgrade to IEEE 802.15 functionality from IEEE 802.11 functionality, the various communication devices within such a communication system can offload the bandwidth used for one operational mode (e.g., IEEE 802.11) for use in another operational mode (e.g., IEEE 802.15.3a). By providing the multi-mode WLAN/PAN MAC within the various communication devices within such a communication system, the overall operation of the communication system may be performed as to ensure greater throughput and overall efficiency.

In view of the above detailed description of the invention and associated drawings, other modifications and variations will now become apparent. It should also be apparent that such other modifications and variations may be effected without departing from the spirit and scope of the invention.

What is claimed is:

1. A communication device including a multi-mode WLAN/PAN MAC (Wireless Local Area Network/Personal Area Network Medium Access Controller), the communication device comprising:
   a PHY (PHYsical layer) receiver; and
   a MAC (Medium Access Controller) that is directly coupled to the PHY receiver at a MAC/PHY interface; and wherein:
   the MAC includes at least two functional blocks to support at least two different operational modes corresponding to at least two different communication system types in which the communication device may operate such that each of the at least two functional blocks performs a separate MAC operation in accordance with a separate one of the at least two different operational modes;
   the PHY receiver includes a first PHY receiver portion and a second PHY receiver portion;
   the first PHY receiver portion is operative to process first received signals from other communication devices within a first of the at least two different communication system types and is operative to provide the processed first received signals to the MAC;
   the second PHY receiver portion is operative to process second received signals from other communication devices within a second of the at least two different communication system types and is operative to provide the processed second received signals to the MAC;
   the communication device is operative simultaneously to receive beacons, that are simultaneously broadcast from an AP (Access Point), corresponding to each of the at least two different operational modes; and
   the communication device is operative simultaneously to monitor the beacons corresponding to each of the at least two different operational modes.

2. The communication device of claim 1, wherein:
   a first operational mode of the at least two different operational modes is a WLAN (Wireless Local Area Network) operational mode;
   a second operational mode of the at least two different operational modes is a piconet/PAN (Personal Area Network) operational mode;
   a first communication system of the at least two different communication system types in which the communication device may operate is a WLAN (Wireless Local Area Network); and
   a second communication system of the at least two different communication system types in which the communication device may operate is a piconet/PAN (Personal Area Network).

3. The communication device of claim 2, wherein:
   the communication device initially operates according to the WLAN operational mode; and
   the communication device subsequently operates according to the piconet/PAN operational mode.

4. The communication device of claim 2, wherein:
   the communication device initially operates according to the piconet/PAN operational mode; and
   the communication device subsequently operates according to the WLAN operational mode.

5. The communication device of claim 2, wherein:
   the communication device initially operates according to the WLAN operational mode; and
   based on a change in a relative location of the communication device with respect to at least one additional communication device, the communication device subsequently operates according to the piconet/PAN operational mode.

6. The communication device of claim 2, wherein:
the communication device initially operates according to the piconet/PAN operational mode; and
based on a change in a relative location of the communication device with respect to at least one additional communication device, the communication device subsequently operates according to the WLAN operational mode.

7. The communication device of claim 2, wherein:
the WLAN operational mode corresponds to one of a plurality of WLAN operational modes; and
the piconet/PAN operational mode corresponds to one of a plurality of piconet/PAN operational modes.

8. The communication device of claim 2, wherein:
the AP is also communicatively coupled to at least one additional communication device;
a first communication link between the communication device and the AP is initially assigned to be a WLAN type operational mode;
a second communication link between the at least one additional communication device and the AP is also initially assigned to be a WLAN type operational mode; and
at least one of the first communication link and the second communication link is subsequently assigned to be a piconet/PAN operational mode.

9. The communication device of claim 2, wherein:
the AP is also communicatively coupled to at least one additional communication device;
a first communication link between the communication device and the AP is initially assigned to be a WLAN type operational mode; and
a second communication link between the at least one additional communication device and the AP is initially assigned to be a piconet/PAN operational mode.

10. The communication device of claim 9, wherein:
the first communication link is subsequently assigned to be a piconet/PAN type operational mode.

11. The communication device of claim 1, wherein:
the communication device is implemented as an integrated circuit.

12. The communication device of claim 1, wherein:
a first beacon of the beacons corresponds to a WLAN (Wireless Local Area Network); and
a second beacon of the beacons corresponds to piconet/PAN (Personal Area Network).

13. The communication device of claim 1, wherein:
a first operational mode of the at least two different operational modes is a WLAN (Wireless Local Area Network) operational mode; and
a second operational mode of the at least two different operational modes is a piconet/PAN (Personal Area Network) operational mode.

14. The communication device of claim 1, wherein:
the communication device provides information corresponding to its capability set to at least one additional communication device when associating with a communication system that includes the communication device and the at least one additional communication device.

15. The communication device of claim 1, wherein:
the communication device undergoes authentication when associating with a communication system while operating according to a first operational mode of the at least two different operational modes; and after the communication device performs an operational mode switch from the first operational mode of the at least two different operational modes to a second operational mode of the at least two different operational modes, the communication device carries along the earlier undergone authentication for use when operating according to the second operational mode of the at least two different operational modes.

16. The communication device of claim 1, wherein:
the communication device establishes an IP (Internet Protocol) layer configuration when associating with a communication system while operating according to a first operational mode of the at least two different operational modes; and
after the communication device performs an operational mode switch from the first operational mode of the at least two different operational modes to a second operational mode of the at least two different operational modes, the communication device carries along the earlier established IP layer configuration when operating according to the second operational mode of the at least two different operational modes.

17. The communication device of claim 1, wherein:
a first operational mode of the at least two different operational modes is a WLAN (Wireless Local Area Network) operational mode;
a second operational mode of the at least two different operational modes is a piconet/PAN (Personal Area Network) operational mode; and
a third operational mode of the at least two different operational modes is a WMAN (Wireless Metropolitan Area Network) operational mode.

18. A communication device including a multi-mode WLAN/PAN MAC (Wireless Local Area Network/Personal Area Network Medium Access Controller), the communication device comprising:
a PHY (PHYsical layer) receiver;
a first MAC (Medium Access Controller) that is directly coupled to the PHY receiver at a MAC/PHY interface; and
a second MAC that is also directly coupled to the PHY receiver; and wherein:
the first MAC is operative to support a first operational mode corresponding to a first communication system type in which the communication device may operate;
the second MAC is operative to support a second operational mode corresponding to a second communication system type in which the communication device may operate;
the PHY receiver includes a first PHY receiver portion and a second PHY receiver portion;
the first PHY receiver portion is operative to process first received signals from other communication devices within a first of the at least two different communication system types and is operative to provide the processed first received signals to the MAC;
the second PHY receiver portion is operative to process second received signals from other communication devices within a second of the at least two different communication system types and is operative to provide the processed second received signals to the MAC;
at any given time, the PHY receiver is operative to provide the processed first received signals or the processed first received signals to only one of the first MAC and the second MAC;
the communication device is operative simultaneously to receive beacons, that are simultaneously broadcast from an AP (Access Point), corresponding to each of the at least two different operational modes; and
the communication device is operative simultaneously to monitor the beacons corresponding to each of the at least two different operational modes.

19. The communication device of claim 18, wherein:
the first operational mode is a WLAN (Wireless Local Area Network) operational mode;
the second operational mode is a piconet/PAN (Personal Area Network) operational mode;
the first communication system in which the communication device may operate is a WLAN (Wireless Local Area Network); and
the second communication system in which the communication device may operate is a piconet/PAN (Personal Area Network).

20. The communication device of claim 19, wherein:
the communication device initially operates according to the WLAN operational mode; and
the communication device subsequently operates according to the piconet/PAN operational mode.

21. The communication device of claim 19, wherein:
the communication device initially operates according to the piconet/PAN operational mode; and
the communication device subsequently operates according to the WLAN operational mode.

22. The communication device of claim 19, wherein:
the communication device initially operates according to the WLAN operational mode; and
based on a change in a relative location of the communication device with respect to at least one additional communication device, the communication device subsequently operates according to the piconet/PAN operational mode.

23. The communication device of claim 19, wherein:
the communication device initially operates according to the piconet/PAN operational mode; and
based on a change in a relative location of the communication device with respect to at least one additional communication device, the communication device subsequently operates according to the WLAN operational mode.

24. The communication device of claim 19, wherein:
the WLAN operational mode corresponds to one of a plurality of WLAN operational modes; and
the piconet/PAN operational mode corresponds to one of a plurality of piconet/PAN operational modes.

25. The communication device of claim 19, wherein:
the AP is also communicatively coupled to at least one additional communication device;
a first communication link between the communication device and the AP is initially assigned to be a WLAN operational mode;
a second communication link between the at least one additional communication device and the AP is also initially assigned to be a WLAN operational mode; and
at least one of the first communication link and the second communication link is subsequently assigned to be a piconet/PAN type operational mode.

26. The communication device of claim 19, wherein:
the AP is also communicatively coupled to at least one additional communication device;
a first communication link between the communication device and the AP is initially assigned to be a WLAN operational mode; and
a second communication link between the at least one additional communication device and the AP is initially assigned to be a piconet/PAN operational mode.

27. The communication device of claim 26, wherein:
the first communication link is subsequently assigned to be a piconet/PAN operational mode.

28. The communication device of claim 18, wherein:
the communication device is implemented as an integrated circuit.

29. The communication device of claim 18, wherein:
a first beacon of the beacons corresponds to a first operational mode; and
a second beacon of the beacons corresponds to a second operational mode.

30. The communication device of claim 18, wherein:
the first operational mode is a WLAN (Wireless Local Area Network) operational mode; and
the second operational mode is a piconet/PAN (Personal Area Network) operational mode.

31. The communication device of claim 18, wherein:
the communication device provides information corresponding to its capability set to at least one additional communication device when associating with a communication system that includes the communication device and the at least one additional communication device.

32. The communication device of claim 18, wherein:
the communication device undergoes authentication when associating with a communication system while operating according to the first operational mode; and
after the communication device performs an operational mode switch from the first operational mode to the second operational mode, the communication device carries along the earlier undergone authentication for use when operating according to the second operational mode.

33. The communication device of claim 18, wherein:
the communication device establishes an IP (Internet Protocol) layer configuration when associating with a communication system while operating according to the first operational mode; and
after the communication device performs an operational mode switch from the first operational mode to the second operational mode, the communication device carries along the earlier established IP layer configuration when operating according to the second operational mode.

34. The communication device of claim 18, wherein:
a first operational mode of the at least two different operational modes is a WLAN (Wireless Local Area Network) operational mode;
a second operational mode of the at least two different operational modes is a piconet/PAN (Personal Area Network) operational mode; and
a third operational mode of the at least two different operational modes is a WMAN (Wireless Metropolitan Area Network) operational mode.

35. A communication device including a multi-mode WLAN/PAN MAC (Wireless Local Area Network/Personal Area Network Medium Access Controller), the communication device comprising:
a PHY (PHYsical layer) receiver; and
a MAC (Medium Access Controller) that is directly coupled to the PHY receiver at a MAC/PHY interface; and wherein:
the MAC includes a first functional block to perform a first MAC operation in accordance with a WLAN (Wireless Local Area Network) operational mode when the communication device operates within a WLAN;
the MAC includes a second functional block to perform a second MAC operation in accordance with a piconet/PAN (Personal Area Network) operational mode when the communication device operates within piconet/PAN; and
the PHY receiver includes a first PHY receiver portion and a second PHY receiver portion;
the first PHY receiver portion is WLAN compatible and is operative to process first received signals from other communication devices within the WLAN and is operative to provide the processed first received signals to the MAC;
the second PHY receiver portion is piconet/PAN compatible and is operative to process second received signals from other communication devices within the piconet/PAN and is operative to provide the processed second received signals to the MAC;
the communication device is operative simultaneously to receive a first beacon corresponding to the WLAN operational mode and a second beacon corresponding to the piconet/PAN (Personal Area Network) operational mode that are simultaneously broadcast from an AP (Access Point); and
the communication device is operative simultaneously to monitor the first beacon and the second beacon.

36. The communication device of claim 35, wherein:
the communication device initially operates according to the WLAN operational mode; and
the communication device subsequently operates according to the piconet/PAN operational mode.

37. The communication device of claim 35, wherein:
the communication device initially operates according to the piconet/PAN operational mode; and
the communication device subsequently operates according to the WLAN operational mode.

38. The communication device of claim 35, wherein:
the communication device initially operates according to the WLAN operational mode; and
based on a change in a relative location of the communication device with respect to at least one additional communication device, the communication device subsequently operates according to the piconet/PAN operational mode.

39. The communication device of claim 35, wherein:
the communication device initially operates according to the piconet/PAN operational mode; and
based on a change in a relative location of the communication device with respect to at least one additional communication device, the communication device subsequently operates according to the WLAN operational mode.

40. The communication device of claim 35, wherein:
the WLAN operational mode corresponds to one of a plurality of WLAN operational modes; and
the piconet/PAN operational mode corresponds to one of a plurality of piconet/PAN operational modes.

41. The communication device of claim 35, wherein:
the communication device is implemented as an integrated circuit.

42. The communication device of claim 35, wherein:
the AP is one AP of a plurality of APs; and
a distribution service backbone couples to each of the plurality of APs.

43. The communication device of claim 35, wherein:
the communication device provides information corresponding to its capability set to at least one additional communication device when associating with a communication system that includes the communication device and the at least one additional communication device.

44. The communication device of claim 35, wherein:
the communication device undergoes authentication when associating with a communication system while operating according to the WLAN operational mode; and
after the communication device performs an operational mode switch from the WLAN operational mode to the piconet/PAN operational mode, the communication device carries along the earlier undergone authentication for use when operating according to the piconet/PAN operational mode.

45. The communication device of claim 35, wherein:
the communication device establishes an IP (Internet Protocol) layer configuration when associating with a communication system while operating according to the WLAN operational mode; and
after the communication device performs an operational mode switch from the WLAN operational mode to the piconet/PAN operational mode, the communication device carries along the earlier established IP layer configuration when operating according to the piconet/PAN operational mode.

46. A communication device including a multi-mode WLAN/PAN MAC (Wireless Local Area Network/Personal Area Network Medium Access Controller), the communication device comprising:
a PHY (PHYsical layer) receiver;
a first MAC (Medium Access Controller) that is directly coupled to the PHY receiver at a MAC/PHY interface; and
a second MAC that is directly coupled to the PHY receiver; and wherein:
the first MAC support a WLAN (Wireless Local Area Network) operational mode when the communication device operates within a WLAN;
the second MAC supports a piconet/PAN (Personal Area Network) operational mode when the communication device operates within a piconet/PAN;
the PHY receiver includes a first PHY receiver portion and a second PHY receiver portion;
the first PHY receiver portion is WLAN compatible and processes first received signals from other communication devices within the WLAN and provides the first received processed signals to the MAC;
the second PHY receiver portion is piconet/PAN compatible and is operative to process second received signals from other communication devices within the piconet/PAN and is operative to provide the processed second received signals to the MAC;
the communication device is operative simultaneously to receive a first beacon corresponding to the WLAN operational mode and a second beacon corresponding to the piconet/PAN (Personal Area Network) operational mode that are simultaneously broadcast from an AP (Access Point); and
the communication device is operative simultaneously to monitor the first beacon and the second beacon.

47. The communication device of claim 46, wherein:
the communication device initially operates according to the WLAN operational mode; and
the communication device subsequently operates according to the piconet/PAN operational mode.

48. The communication device of claim 46, wherein:
the communication device initially operates according to the piconet/PAN operational mode; and
the communication device subsequently operates according to the WLAN operational mode.

49. The communication device of claim 46, wherein:
the WLAN operational mode corresponds to one of a plurality of WLAN operational modes; and
the piconet/PAN operational mode corresponds to one of a plurality of piconet/PAN operational modes.

50. The communication device of claim 46, wherein:
the communication device is implemented as an integrated circuit.

51. The communication device of claim 46, wherein:
the AP is one AP of a plurality of APs; and
a distribution service backbone couples to each of the plurality of APs.

52. The communication device of claim 46, wherein:
the communication device provides information corresponding to its capability set to at least one additional communication device when associating with a communication system that includes the communication device and the at least one additional communication device.

53. The communication device of claim 46, wherein:
the communication device undergoes authentication when associating with a communication system while operating according to the WLAN operational mode; and
after the communication device performs an operational mode switch from the WLAN operational mode to the piconet/PAN operational mode, the communication device carries along the earlier undergone authentication for use when operating according to the piconet/PAN operational mode.

54. The communication device of claim 46, wherein:
the communication device establishes an IP (Internet Protocol) layer configuration when associating with a communication system while operating according to the WLAN operational mode; and
after the communication device performs an operational mode switch from the WLAN operational mode to the piconet/PAN operational mode, the communication device carries along the earlier established IP layer configuration when operating according to the piconet/PAN operational mode.

55. A communication device including a multi-mode WLAN/PAN MAC (Wireless Local Area Network/Personal Area Network Medium Access Controller), the communication device comprising:
a first PHY (PHYsical layer) receiver;
a first MAC (Medium Access Controller) that is directly coupled to the first PHY receiver at a MAC/PHY interface;
a second PHY receiver; and
a second MAC that is directly coupled to the second PHY receiver; and wherein:
the first MAC supports a WLAN (Wireless Local Area Network) operational mode corresponding to a WLAN (Wireless Local Area Network) in which the communication device may operate;
the second MAC supports a piconet/PAN (Personal Area Network) operational mode corresponding to a piconet/PAN (Personal Area Network) in which the communication device may operate;
the first PHY receiver is operable to process first received signals from other communication devices within the first communication system type and to provide the processed first received signals to the first MAC;
the second PHY receiver is operable to process second received signals from other communication devices within the second communication system type and to provide the processed second received signals to the second MAC;
the communication device is operative simultaneously to receive a first beacon corresponding to the WLAN operational mode and a second beacon corresponding to the piconet/PAN (Personal Area Network) operational mode that are simultaneously broadcast from an AP (Access Point); and
the communication device is operative simultaneously to monitor the first beacon and the second beacon.

56. The communication device of claim 55, wherein:
the communication device initially operates according to the WLAN operational mode; and
the communication device subsequently operates according to the piconet/PAN operational mode.

57. The communication device of claim 55, wherein:
the communication device initially operates according to the piconet/PAN operational mode; and
the communication device subsequently operates according to the WLAN operational mode.

58. The communication device of claim 55, wherein:
the communication device initially operates according to the WLAN operational mode; and
based on a change in a relative location of the communication device with respect to at least one additional communication device, the communication device subsequently operates according to the piconet/PAN operational mode.

59. The communication device of claim 55, wherein:
the communication device initially operates according to the piconet/PAN operational mode; and
based on a change in a relative location of the communication device with respect to at least one additional communication device, the communication device subsequently operates according to the WLAN operational mode.

60. The communication device of claim 55, wherein:
the WLAN operational mode corresponds to one of a plurality of WLAN operational modes; and
the piconet/PAN operational mode corresponds to one of a plurality of piconet/PAN operational modes.

61. The communication device of claim 55, wherein:
the communication device is communicatively coupled to an AP (Access Point) that is also communicatively coupled to at least one additional communication device;
a first communication link between the communication device and the AP is initially assigned to be an WLAN operational mode;
a second communication link between the at least one additional communication device and the AP is also initially assigned to be an WLAN operational mode; and
at least one of the first communication link and the second communication link is subsequently assigned to be an piconet/PAN operational mode.

62. The communication device of claim 55, wherein:
the communication device is communicatively coupled to an AP (Access Point) that is also communicatively coupled to at least one additional communication device;
a first communication link between the communication device and the AP is initially assigned to be an piconet/PAN operational mode;

a second communication link between the at least one additional communication device and the AP is also initially assigned to be an piconet/PAN operational mode; and at least one of the first communication link and the second communication link is subsequently assigned to be an WLAN operational mode.

63. The communication device of claim 55, wherein:

the communication device is communicatively coupled to an AP (Access Point) that is also communicatively coupled to at least one additional communication device;

a first communication link between the communication device and the AP is initially assigned to be an WLAN operational mode; and a second communication link between the at least one additional communication device and the AP is initially assigned to be an piconet/PAN operational mode.

64. The communication device of claim 63, wherein:

the first communication link is subsequently assigned to be an piconet/PAN operational mode.

65. The communication device of claim 55, wherein:

the communication device is implemented as an integrated circuit.

66. The communication device of claim 55, wherein:

the AP is one AP of a plurality of APs; and a distribution service backbone couples to each of the plurality of APs.

67. The communication device of claim 55, wherein:

the communication device provides information corresponding to its capability set to at least one additional communication device when associating with a communication system that includes the communication device and the at least one additional communication device.

68. The communication device of claim 55, wherein:

the communication device undergoes authentication when associating with a communication system while operating according to the WLAN operational mode; and after the communication device performs an operational mode switch from the WLAN operational mode to the piconet/PAN operational mode, the communication device carries along the earlier undergone authentication for use when operating according to the piconet/PAN operational mode.

69. The communication device of claim 55, wherein:

the communication device establishes an IP (Internet Protocol) layer configuration when associating with a communication system while operating according to the WLAN operational mode; and after the communication device performs an operational mode switch from the WLAN operational mode to the piconet/PAN operational mode, the communication device carries along the earlier established IP layer configuration when operating according to the piconet/PAN operational mode.

70. A method, comprising:

determining relative locations of an AP (Access Point) and a plurality of STAs (wireless STAtions) with respect to each other within a communication system that initially operates as a WLAN (Wireless Local Area Network);

grouping the AP and any STA of the plurality of STAs located within a relative proximity of the AP of less than a radius of 10 meters thereby forming a piconet/PAN (Personal Area Network);

supporting communication between the AP and any STA of the plurality of STAs within the formed piconet/PAN at a first data rate;

supporting communication between the AP and any STA of the plurality of STAs that is not grouped within the formed piconet/PAN at a second data rate;

from the AP, simultaneously broadcasting beacons corresponding to each of at least two different operational modes;

within each of the plurality of STAs, simultaneously receiving the beacons corresponding to each of the at least two different operational modes; and within each of the plurality of STAs, simultaneously monitoring the beacons corresponding to each of the at least two different operational modes.

71. The method of claim 70, further comprising:

monitoring relative locations of the AP and each STA of the plurality of STAs; and subsequently supporting communication between the AP and any STA of the plurality of STAs within the formed piconet/PAN at the second data rate when any STA of the plurality of STAs within the formed piconet/PAN changes position to a relative location that is outside of the relative proximity of the AP of less than the radius of 10 meters.

72. The method of claim 70, further comprising:

monitoring relative locations of the AP and each STA of the plurality of STAs;

including a STA within the plurality of STAs within the formed piconet/PAN when the STA changes position to a relative location that is within the relative proximity of the AP of less than the radius of 10 meters; and subsequently supporting communication between the AP and the included STA of the plurality of STAs within the formed piconet/PAN at the first data rate.

73. The method of claim 70, wherein:

the AP and each STA of the plurality of STAs includes a PHY (PHYsical layer) receiver communicatively coupled to a multi-mode WLAN/PAN MAC (Wireless Local Area Network/Personal Area Network Medium Access Controller);

the multi-mode WLAN/PAN MAC includes at least two functional blocks to support the at least two different operational modes corresponding to at least two different communication system types in which the AP or the corresponding STA may operate;

a first operational mode of the at least two different operational modes is a WLAN operational mode;

a second operational mode of the at least two different operational modes is a piconet/PAN operational mode;

a first communication system of the at least two different communication system types in which the communication device may operate is the WLAN; and a second communication system of the at least two different communication system types in which the communication device may operate is the formed piconet/PAN.

74. The method of claim 70, wherein:

the AP and each STA of the plurality of STAs includes a PHY (PHYsical layer) receiver communicatively coupled to a multi-mode WLAN/PAN MAC (Wireless Local Area Network/Personal Area Network Medium Access Controller);

the multi-mode WLAN/PAN MAC includes a first MAC that supports a first operational mode corresponding to a first communication system type in which the AP or the corresponding STA may operate;

the multi-mode WLAN/PAN MAC includes a second MAC that supports a second operational mode corresponding to a second communication system type in which the AP or the corresponding STA may operate;
a first communication system of the at least two different communication system types in which the communication device may operate is the WLAN; and
a second communication system of the at least two different communication system types in which the communication device may operate is the formed piconet/PAN.

* * * * *